(12) United States Patent
Kwon et al.

(10) Patent No.: US 11,553,066 B2
(45) Date of Patent: *Jan. 10, 2023

(54) APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

(71) Applicant: LG ELECTRONICS INC., Seoul (KR)

(72) Inventors: Woosuk Kwon, Seoul (KR); Sejin Oh, Seoul (KR); Kyoungsoo Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 129 days.

This patent is subject to a terminal disclaimer.

(21) Appl. No.: 17/012,978

(22) Filed: Sep. 4, 2020

(65) Prior Publication Data
US 2020/0404083 A1 Dec. 24, 2020

Related U.S. Application Data

(63) Continuation of application No. 16/051,928, filed on Aug. 1, 2018, now Pat. No. 10,771,600, which is a (Continued)

(51) Int. Cl.
*H04L 29/08* (2006.01)
*H04L 69/324* (2022.01)
(Continued)

(52) U.S. Cl.
CPC ............ *H04L 69/324* (2013.01); *H04L 69/04* (2013.01); *H04L 69/14* (2013.01);
(Continued)

(58) Field of Classification Search
CPC ....... H04L 69/324; H04L 69/04; H04L 69/14; H04L 2212/00; H04N 21/2362;
(Continued)

(56) References Cited

U.S. PATENT DOCUMENTS 10,771,600 B2 * 9/2020 Kwon ................ H04N 21/6131
2010/0091709 A1 4/2010 Yi et al.
(Continued)

FOREIGN PATENT DOCUMENTS

CN 1842109 A 10/2006
CN 101513009 A 8/2009
(Continued)

OTHER PUBLICATIONS

Adolf, "TM-GBS Progress Report to the 95th TM," TM 4918, Oct. 15, 2013, 32 pages, XP017842220.
(Continued)

*Primary Examiner* — Obaidul Huq
(74) *Attorney, Agent, or Firm* — Birch, Stewart & Birch, LLP

(57) ABSTRACT

A method for transmitting a broadcast signal, includes compressing headers of Internet Protocol (IP) packets in an IP packet stream to output a compressed IP packet stream, the compressed IP packet stream including Initialization Refresh (IR) packets, a first group of IR-dynamic packets, and compressed IP packets; extracting context information from the compressed IP packet stream, wherein when the context information is extracted only from the IR packets in the compressed IP packet stream, the IR packets are converted to a second group of IR-dynamic packets; building signaling information including the context information; and encapsulating the signaling information into one or more signaling link layer packets and the compressed IP packet
(Continued)

stream into link layer packets that are distinct from the one or more signaling link layer packets.

12 Claims, 25 Drawing Sheets

Related U.S. Application Data continuation of application No. 15/112,011, filed as application No. PCT/KR2015/004302 on Apr. 29, 2015, now Pat. No. 10,063,674.

(60) Provisional application No. 61/986,118, filed on Apr. 30, 2014.

(51) Int. Cl.

| | | |
|---|---|---|
| *H04L 69/04* | (2022.01) | |
| *H04N 21/2362* | (2011.01) | |
| *H04N 21/2381* | (2011.01) | |
| *H04N 21/414* | (2011.01) | |
| *H04N 21/434* | (2011.01) | |
| *H04N 21/435* | (2011.01) | |
| *H04N 21/438* | (2011.01) | |
| *H04N 21/61* | (2011.01) | |
| *H04N 21/643* | (2011.01) | |
| *H04L 69/14* | (2022.01) | |

(52) U.S. Cl.
CPC ..... *H04N 21/2362* (2013.01); *H04N 21/2381* (2013.01); *H04N 21/41407* (2013.01); *H04N 21/435* (2013.01); *H04N 21/4345* (2013.01); *H04N 21/4381* (2013.01); *H04N 21/6112* (2013.01); *H04N 21/6131* (2013.01); *H04N 21/6143* (2013.01); *H04N 21/64322* (2013.01); *H04L 2212/00* (2013.01); *Y02D 30/50* (2020.08)

(58) Field of Classification Search
CPC ......... H04N 21/2381; H04N 21/41407; H04N 21/4345; H04N 21/435; H04N 21/4381; H04N 21/6112; H04N 21/6131; H04N 21/6143; H04N 21/64322; Y02D 50/30
USPC .................................................. 370/464, 474
See application file for complete search history.

(56) References Cited

U.S. PATENT DOCUMENTS

| | | |
|---|---|---|
| 2011/0158166 A1 | 6/2011 | Lee et al. |
| 2012/0106413 A1 | 5/2012 | Huang et al. |
| 2013/0039278 A1 | 2/2013 | Bouazizi et al. |
| 2013/0279516 A1 | 10/2013 | Shi |

FOREIGN PATENT DOCUMENTS

| | | |
|---|---|---|
| CN | 102067618 A | 5/2011 |
| CN | 102137439 A | 7/2011 |
| CN | 103329514 A | 9/2013 |
| EP | 2362650 A1 | 8/2011 |
| EP | 2645709 A2 | 10/2013 |
| KR | 10-2008-0012441 A | 2/2008 |
| KR | 10-2008-0066298 A | 7/2008 |
| KR | 10-2012-0139520 A | 12/2012 |
| KR | 10-2013-0127990 A | 11/2013 |
| WO | WO 2011/139266 A | 11/2011 |

OTHER PUBLICATIONS

ETSI, "Digital Video Broadcasting (DVB): Generic Stream Encapsulation (GSE): Part 1: Protocol," ETSI TS 102 606 V1.2.1, Oct. 2013, pp. 1-35, XP017843729.
ETSI, "Digital Video Broadcasting (DVB): Generic Stream Encapsulation (GSE): Part 2: Logical Link Control (LLC)." ETSI dTS 102 606-2 V1.1.1, Oct. 2013, pp. 1-35, XP017843751.
ETSI, "Digital Video Broadcasting (DVB); Generic Stream Encapsulation (GSE); Part 3: Robust Header Compression (ROHC) for IP," TS 102 606-3 V1.1.1, Oct. 2013, pp. 1-10, XP017843766.
Hwang et al., "Guidelines on how to provide MMT transport over Broadcasting Network," International Organisation for Standardisation, Organisation Internationale de Normalisation ISO/IEC JTC1/SC29/WG11 Coding of Moving Pictures and Audio, Apr. 2014, 9 pages, XP030058054.
Pelletier et al., "Robust Header Compression (ROHC) A Profile for TCP/IP (ROHC-TCP)," Internet Engineering Task Force (IETF), Request for Comments (RFC): 6846, Jan. 2013, pp. 1-96, XP015086551.
TM-H/SUL, "ROHC-U+ for IP header compression," TM-IPI meeting, London, Aug. 22, 2011, pp. 1-11, XP017834185.

* cited by examiner

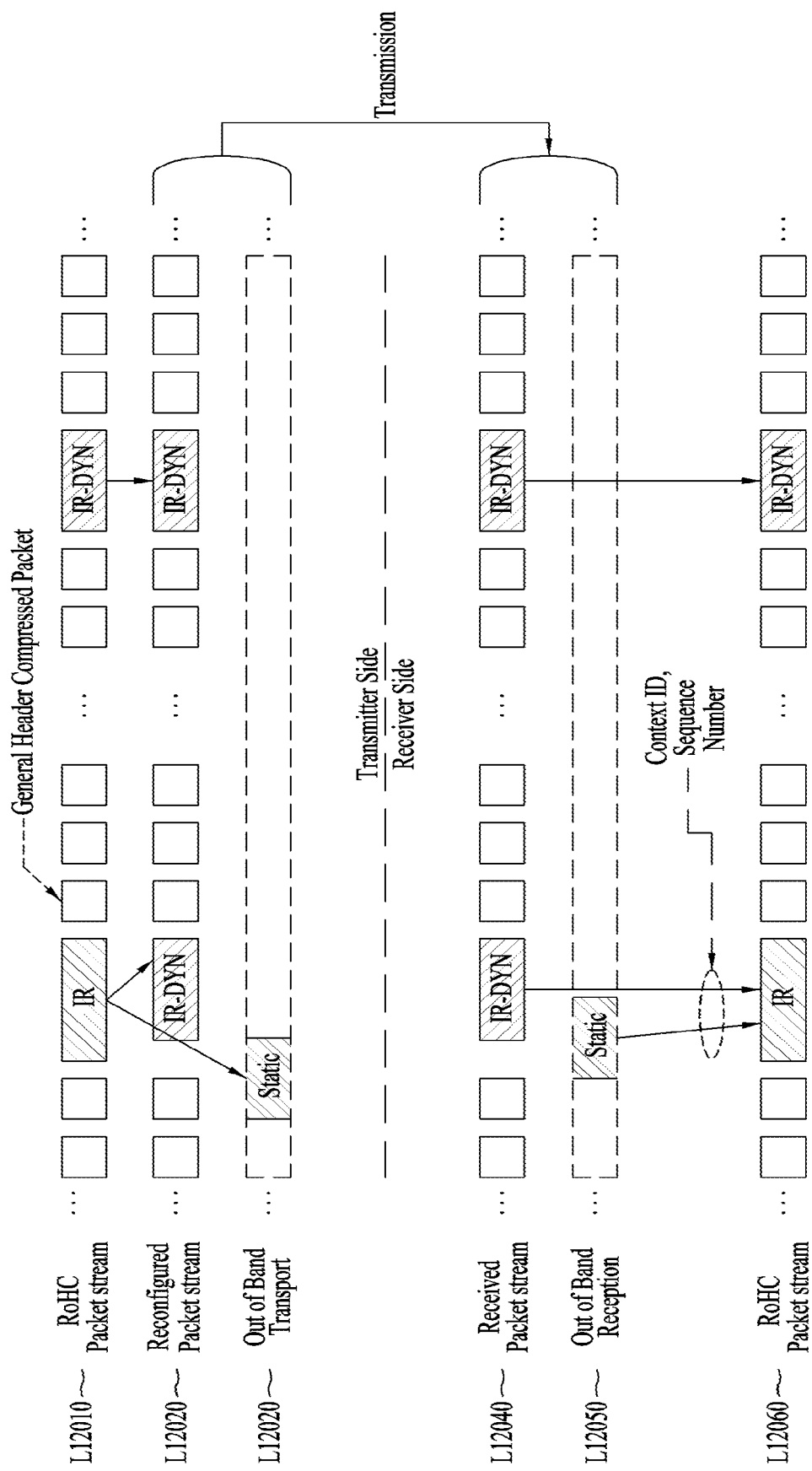

FIG. 13

| Transport Mode | Static Chain | Dynamic Chain | General Header Compressed Packet | Associated Configuration Mode |
|---|---|---|---|---|
| Mode 1 | Signaling | Signaling | Normal Data Pipe | Mode 1, Mode 2 |
| Mode 2 | Signaling | Base Data Pipe | | |
| Mode 3 | Base Data Pipe | Base Data Pipe | | |
| Mode 4 | Signaling | Normal Data Pipe (IR-DYN packet) | | Mode 3 |
| Mode 5 | Base Data Pipe | | | |

FIG. 14

| Syntax | No. of Bits | Format |
|---|---|---|
| ROHC_static_descriptor() { | | |
|     descriptor_tag | 8 | uimsbf |
|     descriptor_length | 8 | uimsbf |
|     context_id | 8 or 16 | |
|     context_profile | 8 | uimsbf |
|     static_chain_length | 8 | uimsbf |
|     static_chain () | var | bslbf |
| } | | |

FIG. 15
| Syntax | No. of Bits | Format |
|---|---|---|
| ROHC_dynamic_descriptor( ) { | | |
| descriptor_tag | 8 | uimsbf |
| descriptor_length | 8 | uimsbf |
| context_id | 8 or 16 | |
| context_profile | 8 | uimsbf |
| dynamic_chain_length | 8 | uimsbf |
| dynamic_chain ( ) | var | bslbf |
| } | | |
FIG. 16

FIG. 17

| Syntax | No. of Bits | Format |
|---|---|---|
| ROHC_init_descriptor( ) { | | |
|     descriptor_tag | 8 | uimsbf |
|     descriptor_length | 8 | uimsbf |
|     context_id | 8 or 16 | |
|     context_profile | 8 | uimsbf |
|     max_cid | 8 | uimsbf |
|     large_cid | 8 | bslbf |
| } | | |

FIG. 18

| Syntax | No. of bits | Format |
|---|---|---|
| Fast_Information_Chunk ( ){ | | |
|     FIT_data_version | 8 | uimsbf |
|     num_broadcast | 8 | uimsbf |
|     for( i=0 ; i<num_broadcast ; i++ ){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         reserved | 3 | '111' |
|         num_service | 8 | uimsbf |
|         for( j=0 ; j< num_service ; j++ ){ | | |
|             service_id | 16 | uimsbf |
|             service_category | 6 | uimsbf |
|             service_hidden_flag | 1 | bslbf |
|             SP_indicator | 1 | bslbf |
|             RoHC_init_descriptor( ) | var | |
|         } | | |
|     } | | |
| } | | |

FIG. 19

| Syntax | No. of bits | Format |
|---|---|---|
| Fast_Information_Chunk( ){ | | |
|     FIT_data_version | 8 | uimsbf |
|     num_broadcast | 8 | uimsbf |
|     for( i=0 ; i<num_broadcast ; i++ ){ | | |
|       broadcast_id | 16 | uimsbf |
|       delivery_system_id | 16 | uimsbf |
|       base_PLP_id | 8 | uimsbf |
|       base_PLP_version | 5 | uimsbf |
|       reserved | 3 | '111' |
|       num_service | 8 | uimsbf |
|       for( j=0 ; j< num_service ; j++ ){ | | |
|         service_id | 16 | uimsbf |
|         service_category | 6 | uimsbf |
|         service_hidden_flag | 1 | bslbf |
|         SP_indicator | 1 | bslbf |
|         context_id | 8 or 16 | |
|         context_profile | 8 | uimsbf |
|         max_cid | 8 | uimsbf |
|         large_cid | 8 | bslbf |
|       } | | |
|     } | | |
| } | | |

FIG. 20

| Syntax | No. of bits | Format |
|---|---|---|
| Fast_Information_Chunk ( ){ | | |
|   FIT_data_version | 8 | uimsbf |
|   num_broadcast | 8 | uimsbf |
|   for( i=0 ; i<num_broadcast ; i++ ){ | | |
|     broadcast_id | 16 | uimsbf |
|     delivery_system_id | 16 | uimsbf |
|     base_PLP_id | 8 | uimsbf |
|     base_PLP_version | 5 | uimsbf |
|     reserved | 3 | '111' |
|     num_service | 8 | uimsbf |
|     for( j=0 ; j< num_service ; j++ ){ | | |
|       service_id | 16 | uimsbf |
|       service_category | 6 | uimsbf |
|       service_hidden_flag | 1 | bslbf |
|       SP_indicator | 1 | bslbf |
|       num_component | 8 | uimsbf |
|       for( k=0 ; k<num_component ; k++ ){ | | |
|         component_id | 8 | bslbf |
|         PLP_id | 8 | bslbf |
|         RoHC_init_descriptor( ) | var | |
|       } | | |
|     } | | |
|   } | | |
| } | | |

FIG. 21

| Syntax | No. of bits | Format |
|---|---|---|
| Fast_Information_Chunk(){ | | |
|   FIT_data_version | 8 | uimsbf |
|   num_broadcast | 8 | uimsbf |
|   for( i=0 ; i<num_broadcast ; i++){ | | |
|     broadcast_id | 16 | uimsbf |
|     delivery_system_id | 16 | uimsbf |
|     base_PLP_id | 8 | uimsbf |
|     base_PLP_version | 5 | uimsbf |
|     reserved | 3 | '111' |
|     num_service | 8 | uimsbf |
|     for( j=0 ; j< num_service ; j++){ | | |
|       service_id | 16 | uimsbf |
|       service_category | 6 | uimsbf |
|       service_hidden_flag | 1 | bslbf |
|       SP_indicator | 1 | bslbf |
|       num_component | 8 | uimsbf |
|       for( k=0 ; k<num_component ; k++){ | | |
|         component_id | 8 | bslbf |
|         PLP_id | 8 | bslbf |
|         context_id | 8 or 16 | |
|         context_profile | 8 | uimsbf |
|         max_cid | 8 | uimsbf |
|         large_cid | 8 | bslbf |
|       } | | |
|     } | | |
|   } | | |
| } | | |

FIG. 23

| Signaling Class | Description |
|---|---|
| 000 | Signaling for Channel Scan and Service Acquisition |
| 001 | Signaling for Emergency Alert |
| 010 | Signaling for Header Compression |
| 011 | Reserved |
| 100 | Reserved |
| 101 | Reserved |
| 110 | Reserved |
| 111 | Various |

FIG. 24

| Information Type for Header Compression | Description |
|---|---|
| 000 | Initialization Information |
| 001 | Configuration Parameters |
| 010 | Static Chain |
| 011 | Dynamic Chain |
| 100 | Reserved |
| 101 | Reserved |
| 110 | Reserved |
| 111 | Reserved |

FIG. 25

| Syntax | No. Bits | Format |
|---|---|---|
| Payload_for_Initialization() { | | |
|     num_RoHC_channels | 8 | uimsbf |
|     for(i=0;i<num_DP;i++) { | | |
|         RoHC_channel_id | 8 | uimsbf |
|         max_cid | 16 | uimbf |
|         large_cids | 1 | bslbf |
|         reserved | 3 | '111' |
|         num_profiles | 4 | uimsbf |
|         for(j=0;j<num_profiles;j++) { | | |
|             profiles() | var | uimsbf |
|         } | | |
|         num_IP_stream | 8 | uimsbf |
|         for(k=for(k=0;k<num_IP_stream;k++) { | | |
|             IP_address() | var | uimsbf |
|         } | | |
|     } | | |
| } | | |

FIG. 26

| Syntax | No. Bits | Format |
|---|---|---|
| Payload_for_ROHC_configuration() { | | |
|     RoHC_channel_id | 8 | uimsbf |
|     num_context | 8 | uimsbf |
|     for(i=0;i<num_DP;i++) { | | |
|         context_id | 8 or 16 | uimsbf |
|         context_profile | 8 | uimsbf |
|         packet_configuration_mode | 4 | uimsbf |
|         context_transmission_mode | 4 | uimsbf |
|     } | | |
| } | | |

FIG. 27

| Syntax | No. Bits | Format |
|---|---|---|
| Payload_for_static_chain() { | | |
| context_id | 8 or 16 | uimsbf |
| context_profile | 8 | uimsbf |
| static_chain_length | 8 | uimsbf |
| static_chain () | var | bslbf |
| dynamic_chain_incl | 1 | uimsbf |
| reserved | 7 | '111' |
| if( dynamic_chain_incl == 0x01) { | | |
| dynamic_chain_length | 8 | uimsbf |
| dynamic_chain () | var | bslbf |
| } | | |
| } | | |

FIG. 28

| Syntax | No. Bits | Format |
|---|---|---|
| Payload_for_dynamic_chain() { | | |
| context_id | 8 or 16 | |
| context_profile | 8 | uimsbf |
| dynamic_chain_length | 8 | uimsbf |
| dynamic_chain () | var | bslbf |
| } | | |

APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

CROSS-REFERENCE TO RELATED APPLICATIONS

This Application is a Continuation of U.S. patent application Ser. No. 16/051,928 filed on Aug. 1, 2018 (now U.S. Pat. No. 10,771,600 issued on Sep. 8, 2020), which is a Continuation of U.S. patent application Ser. No. 15/112,011 filed on Jul. 15, 2016 (now U.S. Pat. No. 10,063,674 issued on Aug. 28, 2018), which is the National Phase of PCT International Application No. PCT/KR2015/004302 filed on Apr. 29, 2015, which claims the priority benefit under 35 U.S.C. § 119(e) to U.S. Provisional Application No. 61/986,118 filed on Apr. 30, 2014, all of these applications are hereby expressly incorporated by reference into the present application.

BACKGROUND OF THE INVENTION

Field of the Invention

The present invention relates to transmission and reception of a broadcast signal and, more particularly, to a method and/or apparatus for transmitting and receiving a broadcast signal including a robust header compression (RoHC) packet stream.

Discussion of the Related Art

As analog broadcasting will soon end, a variety of technologies for transmitting and receiving digital broadcast signals has been developed. Digital broadcast signals can transmit a greater capacity of video/audio data than analog broadcast signals, and can include a variety of optional data in addition to video/audio data.

A digital broadcast system can provide High Definition (HD) images, multi-channel sound, and a variety of optional services. However, data transmission efficiency for high capacity data transmission, robustness of transmitting and receiving networks, and flexibility of networks in consideration of mobile receiving equipment are problems that should still be improved. IP/UDP/RTP header fields may be generally classified into static, delta, dynamic, and inferred attributes. Static is a field having a fixed value in one end to end packet stream. This field corresponds to an IP address and port number. In addition, this field also corresponds to a field, such as a RTP or IP version field, having a well-known value. Delta is a field having a fixed value difference from a previous packet. This field corresponds to sequence number. Dynamic is a randomly changeable field. This field corresponds to checksum and ID of an IP packet. Inferred corresponds to a field which may be inferred through another header field, such as a length field. A context identifier (CID) concept is introduced for a general header compression scheme. When a compressor sends a packet having an uncompressed full header while a specific CID is added thereto first and sends subsequent packets while omitting header fields having static, dynamic, or inferred properties as the same CID, a decompressor recovers all RTP headers by adding the omitted field to the compression header received after the second packet with reference to initially stored header field information based on the CID. For the delta header, the compressor and the decompressor store most fields of the full headers and, when the compressor transports only a difference value from a previous packet, the decompressor corrects the difference value using a previously stored value to perform recovery.

Robust Header Compression (RoHC) is a standardized scheme for compressing headers, such as IP, UDP, RTP, and TCP. In a streaming application, the IP, UDP, and RTP each have an overhead of 40 bytes for IPv4 and 60 bytes for IPv6. For VoIP, this value is equivalent to 60% all transported data. Such a great overhead may cause a serious problem in a wireless system having a limited bandwidth. Through RoHC, the overhead of 40 bytes or 60 bytes is compressed to 1 or 3 bytes, and decompression is performed after being delivered to the decompressor.

In RoHC, header fields are classified into static, dynamic, and inferable. A compression state in the compressor may be defined as Initialization and Refresh (IR), First Order (FO), and Second Order (SO) and a decompression state in the decompressor is defined as No Context (NC), Static Context (SC), and Full Context (FC). The RoHC scheme is to start transport at a low compression rate and to maintain a state in which transport is performed at the possible highest compression rate. When the decompressor fails to perform context initialization or decompression, a state of the compressor returns to IR, which is the lowest compression step, and in this state the compressor transports full headers. Subsequently, at the FO step, the compressor omits the static field. Finally, at the SO step, all compressible fields are not transported. A state of the decompressor may be changed from NC, which is the lowest step, to the SC and FC steps. At the FC step, an optimal decompression operation is performed.

RoHC performs compression in a scheme in which total headers are transported at the beginning of transport and unchanged portions are omitted in the middle of transport. In a case in which this scheme is adopted by a broadcasting system, a broadcast receiver may not know when to receive an IP stream and a receiver which does not know all header information may not recognize a corresponding IP packet.

SUMMARY OF THE INVENTION

An object of the present invention devised to solve the problem lies on a method and/or apparatus for transmitting and receiving a broadcast signal including an RoHC packet stream.

Another object of the present invention devised to solve the problem lies on a method of recovering a packet irrespective of an access time of a receiver in a unidirectional transport system.

Another object of the present invention devised to solve the problem lies on a method of transporting RoHC-related metadata to a decompressor in advance in a unidirectional transport system.

Another object of the present invention devised to solve the problem lies on a method of transporting RoHC-related metadata through a separate channel in a unidirectional transport system.

A further object of the present invention devised to solve the problem lies on a method of extracting information to be transported through a separate channel from an RoHC packet stream.

The object of the present invention can be achieved by providing a broadcast signal transmitting method including compressing a header of an IP packet included in an IP packet stream to output an RoHC (Robust Header Compression) packet stream, generating a signaling packet including information of at least one RoHC packets included the RoHC packet stream, wherein the signaling packet includes a signaling packet header and a signaling packet payload, wherein the signaling packet header includes signaling information that is included in the signaling packet payload, transporting the signaling packet through a first channel and transporting the RoHC packet stream through a second channel.

The object of the present invention can be achieved by providing a broadcast signal receiving method including receiving a signaling packets through a first channel, receiving a RoHC (Robust Header Compression) packet stream including at least one RoHC packet through a second channel, decompressing a header of the RoHC packet based on an information included in the signaling packet to output an IP packet stream, wherein the signaling packet includes a signaling packet header and a signaling packet payload and acquiring broadcast data based on the output IP packet stream.

The object of the present invention can be achieved by providing a broadcast signal transmitting apparatus including an header compressor to compress a header of an IP packet included in an IP packet stream to output an RoHC (Robust Header Compression) packet stream, a generating unit to generate a signaling packet including information of at least one RoHC packets included the RoHC packet stream, wherein the signaling packet includes a signaling packet header and a signaling packet payload, wherein the signaling packet header includes signaling information that is included in the signaling packet payload and a transport unit to transport the signaling packet through a first channel and the RoHC packet stream through a second channel.

The object of the present invention can be achieved by providing a broadcast signal receiving apparatus including receiving unit to receive a signaling packets through a first channel and to receive a RoHC (Robust Header Compression) packet stream including at least one RoHC packet through a second channel, a header decompressor to decompress a header of the RoHC packet based on an information included in the signaling packet to output an IP packet stream, wherein the signaling packet includes a signaling packet header and a signaling packet payload and an IP packet processing unit to acquire broadcast data based on the output IP packet stream.

According to the present invention, it is possible to transmit and receive a broadcast signal including an RoHC packet stream.

According to the present invention, it is possible to recover a transported packet irrespective of an access time of a receiver.

According to the present invention, it is possible for the receiver to receive RoHC-related metadata before reception of real data.

According to the present invention, it is possible to transport RoHC-related metadata through a channel different from a real data transport channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 12 is a view showing a configuration and recovery procedure of an RoHC packet stream in a third configuration mode (Configuration Mode #3) according to an embodiment of the present invention.

FIG. 13 is a view showing a combination of information that can be delivered through Out of Band according to an embodiment of the present invention.

FIG. 14 is a view showing configuration of a descriptor including a static chain according to an embodiment of the present invention.

FIG. 15 is a view showing configuration of a descriptor including a dynamic chain according to an embodiment of the present invention.

FIG. 16 is a view showing configuration of a packet format including a static chain and a packet format including a dynamic chain according to an embodiment of the present invention.

FIG. 17 is a diagram illustrating configuration of ROHC_init_descriptor( ) according to an embodiment of the present invention.

FIG. 18 is a diagram illustrating configuration of Fast_Information_Chunk( ) including ROHC_init_descriptor( ) according to an embodiment of the present invention.

FIG. 19 is a diagram illustrating configuration of Fast_Information_Chunk( ) including a parameter required for a RoHC initial procedure according to an embodiment of the present invention.

FIG. 20 is a diagram illustrating configuration of Fast_Information_Chunk( ) including ROHC_init_descriptor( ) according to another embodiment of the present invention.

FIG. 21 is a diagram illustrating configuration of Fast_Information_Chunk( ) including a parameter required for a RoHC initial procedure according to another embodiment of the present invention.

FIG. 23 is a chart that defines the signaling class field according to the present embodiment.

FIG. 24 is a chart that defines an information type.

FIG. 25 is a diagram illustrating a structure of Payload_for_Initialization( ) according to an embodiment of the present invention when an information type for header compression has a value of "000".

FIG. 26 is a diagram illustrating a structure of Payload_for_ROHC_configuration( ) when the information type for header compression has a value of "001".

FIG. 27 is a diagram illustrating a structure of Payload_for_static_chain( ) when the information type for header compression has a value of "010".

FIG. 28 is a diagram illustrating a structure of Payload_for_dynamic_chain( ) when the information type for header compression has a value of "011".

DETAILED DESCRIPTION OF THE EMBODIMENTS

Figure 1:
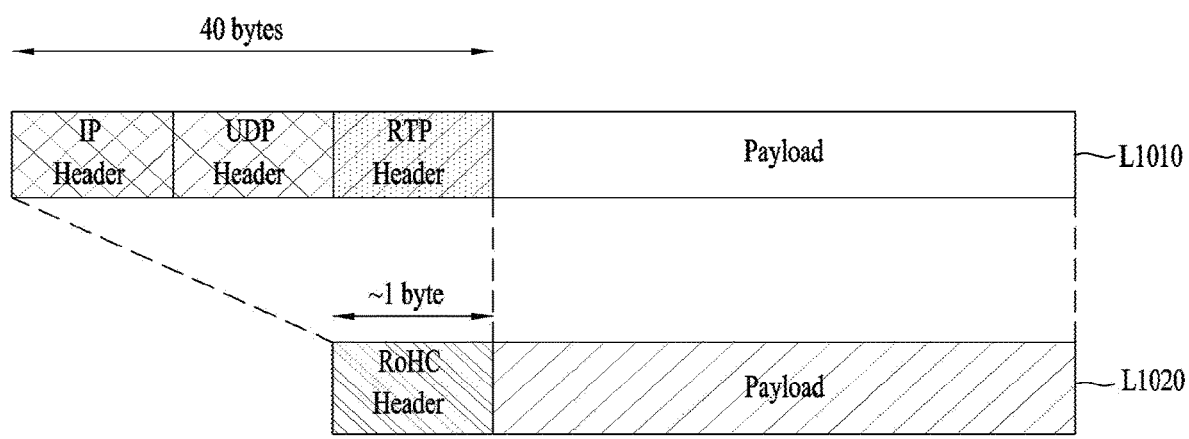
FIG. 1 is a view showing the structure of a Robust Header Compression (RoHC) packet and an uncompressed Internet Protocol (IP) packet according to an embodiment of the present invention.

Reference will now be made in detail to the preferred embodiments, examples of which are illustrated in the accompanying drawings. It should be noted herein that these embodiments are only for illustrative purposes and the present specification is not limited or restricted by the illustrated embodiments.

Terms used in present specification are general terms selected in consideration of functions and widely used at the present time. However, such terms may vary depending upon intentions of those skilled in the art to which the present specification pertains, usual practices, or appearance of new technology. In a specific case, some terms may be selected by the applicant of the present application. In this case, meanings of such terms will be described in corresponding paragraphs of present specification. Therefore, it should be noted that terms used in present specification be interpreted based on real meanings of the terms and the present specification, not simple names of the terms.

In this specification, 'signaling' indicates transport/reception of service information (SI) provided by a broadcasting system, an Internet broadcasting system, and/or a broadcasting/Internet convergence system. The service information includes broadcasting service information (for example, ATSC-SI and/or DVB-SI) provided by existing broadcasting systems.

In this specification, a 'broadcast signal' is defined as a concept including a signal and/or data provided in bidirectional broadcasting, such as Internet broadcasting, broadband broadcasting, communication broadcasting, data broadcasting, and/or Video On Demand (VOD), in addition to terrestrial broadcasting, cable broadcasting, satellite broadcasting, and/or mobile broadcasting.

In this specification, 'PLP' means a fixed unit for transporting data belonging to a physical layer. Consequently, an element named 'PLP' may also be named a 'data unit' or a 'data pipe'.

One of the powerful applications utilized in a digital broadcasting (DTV) service may be a hybrid broadcasting service based on interlocking between a broadcasting network and an Internet network.

In the hybrid broadcasting service, enhancement data associated with broadcast audio/video (A/V) content transported through a terrestrial broadcasting network or a portion of the broadcast A/V content is transported through the Internet network in real time such that users can experience various kinds of content.

It is an object of the present invention to propose a method of encapsulating an IP packet, an MPEG-2 TS packet, and a packet that can be used in other broadcasting system such that the packets can be delivered to a physical layer in a next generation digital broadcasting system. In addition, the present invention also proposes a method of transporting layer 2 signaling with the same header format.

The following procedures may be realized by an apparatus. For example, a signaling processing unit, a protocol processing unit, a processor, and/or a packet generation unit may perform the following procedures.

FIG. 1 is a view showing the structure of a Robust Header Compression (RoHC) packet and an uncompressed Internet Protocol (IP) packet according to an embodiment of the present invention.

An IP packet L1010 according to an embodiment of the present invention may include an IP Header, a User Datagram Protocol Header (UDP header), a Real time Transport Protocol Header (RTP Header), and/or a Payload.

An IP Header, a UDP Header, and an RTP Header according to an embodiment of the present invention may have a total length of about 40 bytes.

An RoHC Packet L1020 according to an embodiment of the present invention may include an RoHC Header and/or a Payload.

An RoHC Header according to an embodiment of the present invention is one obtained by compressing the headers of the IP packet. The RoHC Header may have a length of about 1 byte.

According to an embodiment of the present invention, RoHC may indicate the total headers as one context ID. RoHC may perform compression in a scheme in which the total headers are transported at the beginning of transport and unchanged portions are omitted excluding context ID and main information in the middle of transport.

According to an embodiment of the present invention, IP version, IP source address, IP destination address, IP fragment flag, UDP source port, UDP destination port, etc. may be almost unchanged at the time of IP streaming Almost unchanged fields during streaming like the above-described fields may be named static fields. RoHC according to an embodiment of the present invention may not further transport such static fields for a while after transporting the static fields once. An embodiment of the present invention may name a state in which the static fields are not further transported for a while after transporting the static fields once an Initialization Refresh (IR) state and name a packet transporting the static fields an IR packet. In addition, according to an embodiment of the present invention, fields which are changed at any time but are maintained for a predetermined time may be named dynamic fields. An embodiment of the present invention may further transport the above-described dynamic fields. According to an embodiment of the present invention, a packet transporting the dynamic fields may be named an IR-DYN packet. According to an embodiment of the present invention, the IR packet and the IR-DYN packet may have a similar size to a conventional header since the IR packet and the IR-DYN packet contain all information of the conventional header.

According to an embodiment of the present invention, a method of compressing a header portion of the IP packet to reduce overhead of transported Internet Protocol (IP) packet data may be used. According to an embodiment of the present invention, an RoHC scheme, which is one of the IP packet header compression schemes, may be used and the RoHC scheme may secure reliability in a wireless section. The RoHC scheme may be used in a broadcasting system, such as Digital Video Broadcasting-Next Generation Handheld (DVB-NGH) and a mobile communication system, such as Long Term Evolution (LTE). The RoHC scheme may be used for a UDP and/or RTP packet although the RoHC scheme is a scheme for compressing and transporting the header of the IP packet.

According to an embodiment of the present invention, RoHC may indicate the total headers as one context ID. RoHC may perform compression in a scheme in which the total headers are transported at the beginning of transport and unchanged portions are omitted excluding context ID and main information in the middle of transport. In a case in which the above-described RoHC scheme is applied to a broadcasting system, a broadcast receiver may not know when to receive an IP stream and a general receiver which does not know all header information may not recognize a corresponding IP packet. An embodiment of the present invention may solve the above-described problem using signaling used in the broadcasting system.

An embodiment of the present invention may provide an IP header compression method for supporting sufficient transport of an IP packet in a next generation digital broadcasting system.

According to another embodiment of the present invention, the RoHC scheme may be applied to a packet of a FLUTE-based protocol. In order to apply the RoHC scheme to a FLUTE/ALC/LCT packet according to an embodiment of the present invention, a packet header may be classified into static fields, dynamic fields, and inferable fields. In the FLUTE/ALC/LCT packet according to an embodiment of the present invention, the static fields may include LCT Version Number (V), Congestion Control flag (C), Transport Session Identifier flag (S), Half-word flag (H), Congestion Control Information (CCI), Transport Session Identification (TSI), and/or Expected Residual Transmission time (ERT). LCT Version Number (V) may be a 4-bit field indicating version number of an LCT protocol. This field may be fixed to 1. Congestion Control flag (C) may be a 2-bit field indicating the size of Congestion Control. This field may have a size of 32, 64, 96, or 128 bits according to a value. Transport Session Identifier flag (S) may be a 1-bit field, which may be a variable indicating the size of TSI. This field may have a size of 32*S+16*H. Half-word flag (H) may be a 1-bit field, which may be a common variable indicating the size of TSI and TOI. Congestion Control Information (CCI) may have a size of 32, 64, 96, or 128 bits. This field may be a value used for a receiver to Congestion Control a packet in a transported session. This field may include the number of layers, the number of logical channels, and sequence numbers. This field may be used to refer to throughput of an available bandwidth in a path between a transmitter and the receiver. Transport Session Identification (TSI) may have a size of 16, 32, or 48 bits. This field may indicate an identifier identifying a session from a specific transmitter. Expected Residual Transmission time (ERT) is a 0 or 32-bit field indicating a time during which reception is effective. In the FLUTE/ALC/LCT packet according to an embodiment of the present invention, the dynamic fields may include Transport Object Identifier flag (O), Close Session flag (A), Close Object flag (B), LCT header length (HDR_LEN), CodePoint (CP), Sender Current Time (SCT), and/or Source Block Number (SBN). Transport Object Identifier flag (O) may be a 2-bit field, which may be a variable indicating the size of TOI. This field may have a size of 32*O+16*H. Close Session flag (A) may be a 1-bit field. This field may be generally set to 0. This field may be set to 1 when transport of a session packet is completed. Close Object flag (B) may be a 1-bit field. This field may be generally set to 0. This field may be set to 1 when transport of a data (Object) packet is completed. LCT header length (HDR_LEN) may be an 8-bit field. This field may express a header of LCT as 32 bits. CodePoint (CP) may be an 8-bit field indicating data type. Sender Current Time (SCT) may be a 0 or 32-bit field indicating a time during which the transmitter transports data to the receiver. Source Block Number (SBN) may be a 32-bit field. This field may identify a Source block of an Encoding Symbol in a generated Payload. In the FLUTE/ALC/LCT packet according to an embodiment of the present invention, the inferable fields may include Transport Object Identification (TOI), FEC Payload ID, Encoding Symbol ID (ESI), and/or Encoding Symbol(s). Transport Object Identification (TOI) may be a field having 16, 32, 48, 64, 80, 96, or 112 bits indicating an identifier identifying data (Object) from the receiver. The length and format of FEC Payload ID may be set by FEC Encoding ID. This field may be included in an FEC building block. Encoding Symbol ID (ESI) may be a 32-bit field identifying a special Encoding Symbol generated from a Source Block in a Payload. Encoding Symbol(s) may be divided data from which the receiver reforms data and have a variable size based on a divided size.

Figure 2:
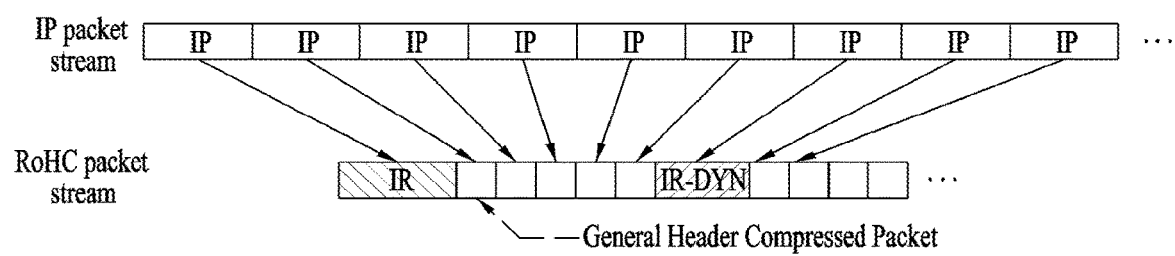
FIG. 2 is a view showing a concept of an RoHC packet stream according to an embodiment of the present invention.

FIG. 2 is a view showing a concept of an RoHC packet stream according to an embodiment of the present invention.

As shown in this figure, static fields transported while being included in an IR packet and dynamic fields transported while being included in an IR-DYN packet may be transported only when needed. Other packets may be transported in the form of a header compressed packet including only about 1 to 2 bytes information.

According to an embodiment of the present invention, it is possible to reduce a header of 30 bytes or more per packet through the above-described concept of the RoHC packet stream. The header compressed packet may be classified into type 0, type 1, and type 2 according to the form of a compressed header. Use of an RoHC packet according to an embodiment of the present invention may conform to a conventional standard document.

Figure 3:
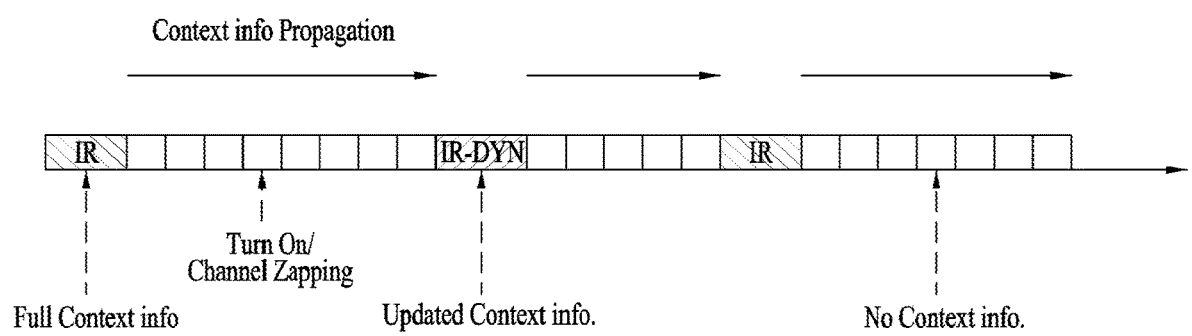
FIG. 3 is a view showing a context information propagation procedure during transport of an RoHC packet stream according to an embodiment of the present invention.

FIG. 3 is a view showing a context information propagation procedure during transport of an RoHC packet stream according to an embodiment of the present invention.

As shown in this figure, full context info may be included in an IR packet and updated context info may be included in an IR-DYN packet. In addition, a header compressed packet excluding the IR packet and the IR-DYN packet may not include context info.

According to an embodiment of the present invention, a receiver having no IR information may not decode an RoHC stream until receiving the next IR packet to configure full context for unidirectional transport having no feedback channel. That is, in this figure, in a case in which the receiver receives an RoHC stream from a part denoted by Turn On, the receiver may not decode the RoHC stream until receiving the next IR packet. An embodiment of the present invention may transport IR information through a separate signaling channel so as to solve the above-described problem.

According to an embodiment of the present invention, RoHC configuration information, initial parameter, and/or IR packet information (full context information) may be needed so as to normally decode a transported RoHC packet.

According to an embodiment of the present invention, a header compressed packet compressed using an IP header compression method may be in-band transported and an IR packet including a static chain containing unchanged header information and a dynamic chain for context update may be out-of-band transported so as to reduce overhead of IP transport and to achieve efficient transport. At this time, packets received by the receiver may be recovered in order before transport.

Figure 4:
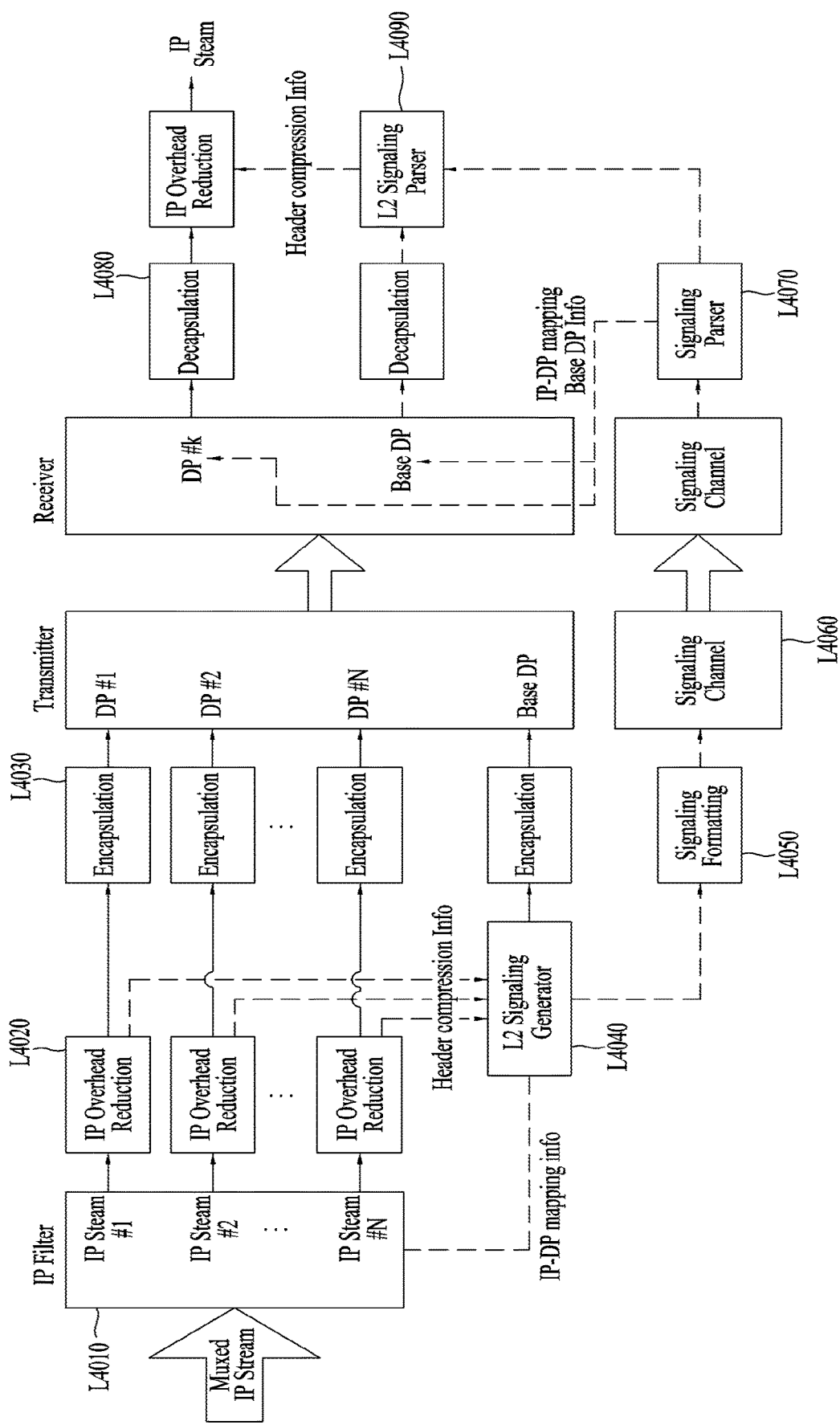
FIG. 4 is a view showing a transmitting and receiving system of an IP stream, to which an IP header compression scheme according to an embodiment of the present invention is applied.

FIG. 4 is a view showing a transmitting and receiving system of an IP stream, to which an IP header compression scheme according to an embodiment of the present invention is applied.

According to an embodiment of the present invention, IP streams may be configured to enter different Data Pipes (DPs). At this time, Header Compression Info may be transported to a receiver through an L2 signaling transport procedure and Header Compression Info may be used to recover the IP stream, to which the IP header compression scheme is applied, received by the receiver to an original IP stream. Header Compression Info may be encapsulated and transported to a DP. At this time, Header Compression Info may be transported to a normal DP or a DP for signaling transport (Base DP) according to the structure of a physical layer. In addition, Header Compression Info may be transported through a separate signaling channel in a case in which it is supported by the physical layer.

According to an embodiment of the present invention, IP-DP mapping info may be transported to the receiver through the L2 signaling transport procedure and IP-DP mapping info may be used to recover the IP stream from the DP received by the receiver. IP-DP mapping info may be encapsulated and transported to a DP. At this time, IP-DP mapping info may be transported to a normal DP or a DP for signaling transport (Base DP) according to the structure of a physical layer. In addition, IP-DP mapping info may be transported through a separate signaling channel in a case in which it is supported by the physical layer.

As shown in this figure, an IP Stream muxed by a compressor may be divided into one or more IP streams by an IP Filter L4010. Each IP stream may be compressed by an IP header compression scheme L4020 and may be transported to each DP through an encapsulation procedure L4030. At this time, an L2 Signaling Generator L4040 may generate signaling information including Header Compression Info and/or IP-DP mapping info. The generated signaling information may be encapsulated and transported to a decompressor through a Base DP or may pass through a Signaling Formatting procedure L4050 and transported to the decompressor through a signaling channel L4060.

As shown in this figure, the DPs received by the decompressor may be recovered into respective IP streams by IP-DP mapping info parsed by a Signaling Parser L4070. The IP streams, having passed through a Decapsulation procedure L4080, may be recovered into the IP stream before the IP header compression scheme is applied by Header Compression Info parsed by an L2 Signaling Parser L4090.

Figure 5:
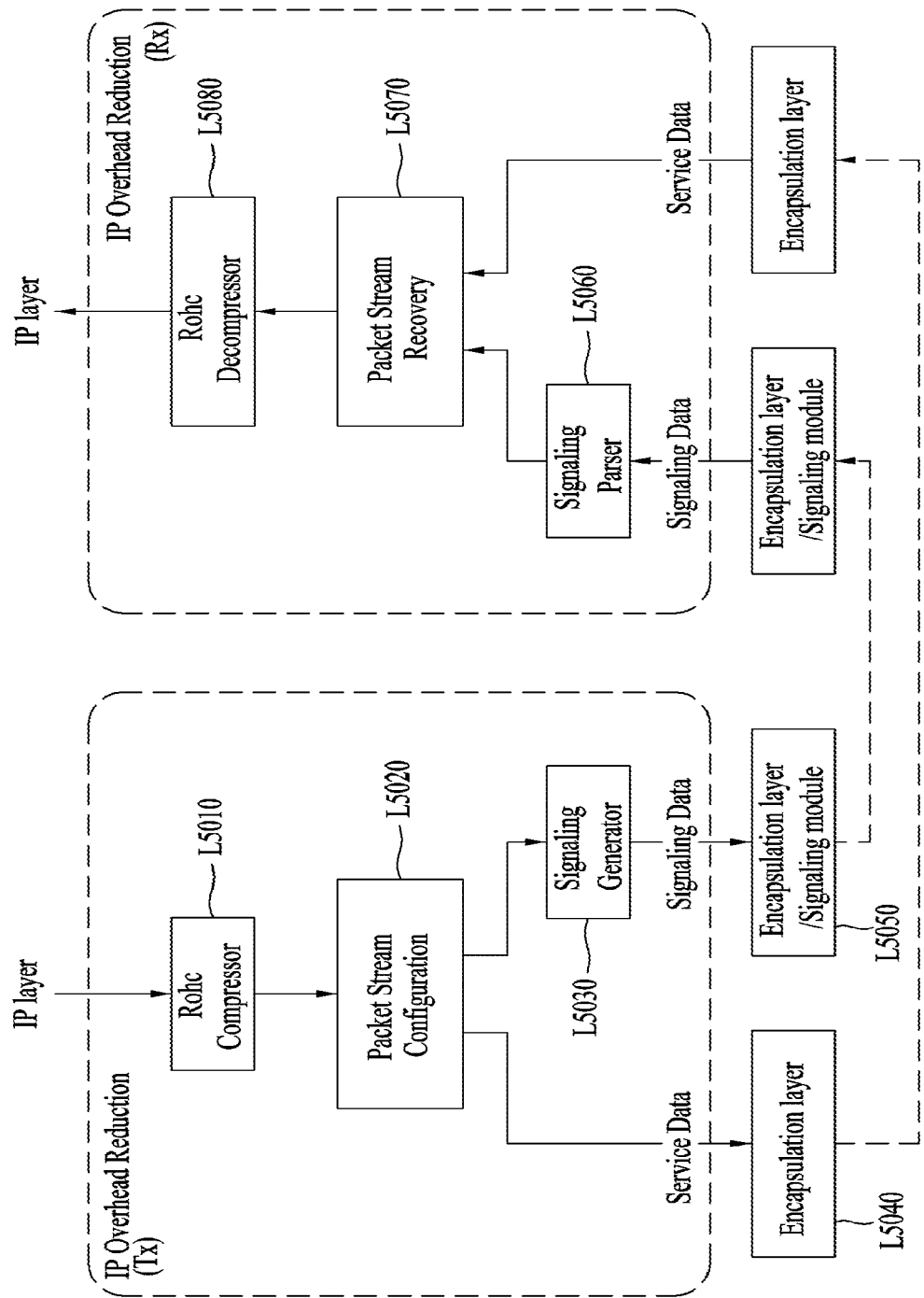
FIG. 5 is a view showing an IP overhead reduction procedure in a transmitter/receiver according to an embodiment of the present invention.

FIG. 5 is a view showing an IP overhead reduction procedure in a transmitter/receiver according to an embodiment of the present invention.

According to an embodiment of the present invention, when an IP stream enters an overhead reduction procedure, an RoHC Compressor L5010 may perform header compression for the corresponding stream. An embodiment of the present invention may use an RoHC method as a header compression algorithm. In a Packet Stream Configuration procedure L5020, a packet stream having passed through an RoHC procedure may be reconfigured according to the form of an RoHC packet. The reconfigured RoHC packet stream may be delivered to an encapsulation layer L5040 and then transported to the receiver through a physical layer. RoHC context information and/or signaling information generated in a procedure of reconfiguring the packet stream may be made into a transportable form through a signaling generator L5030 and delivered to an encapsulation layer or a signaling module L5050 according to the form of transport.

According to an embodiment of the present invention, the receiver may receive a stream for service data and signaling data delivered through a signaling channel or a separate DP. A Signaling Parser L5060 may receive signaling data to parse RoHC context information and/or signaling information and deliver the parsed information to a Packet Stream Recovery procedure L5070. In the Packet Stream Recovery procedure L5070, the receiver may recover the packet stream reconfigured by the compressor into a form in which an RoHC decompressor L5080 can decompress the packet stream using RoHC context information and/or signaling information included in the signaling data. The RoHC Decompressor L5080 may convert the recovered RoHC packet stream into an IP stream. The converted IP stream may be delivered to an upper layer through an IP layer.

Figure 6:
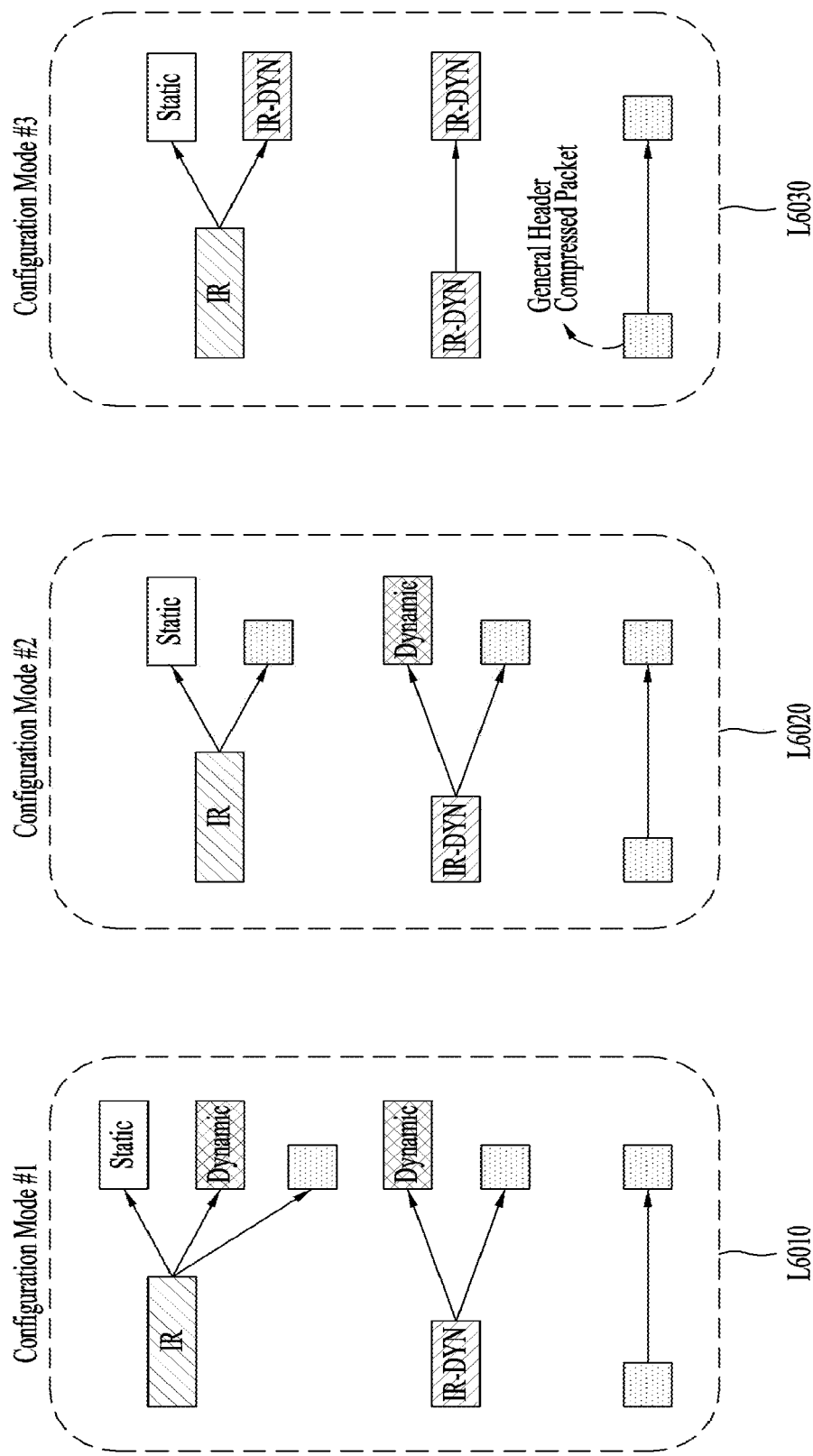
FIG. 6 is a view showing a procedure of reconfiguring an RoHC packet to configure a new packet stream according to an embodiment of the present invention.

FIG. 6 is a view showing a procedure of reconfiguring an RoHC packet to configure a new packet stream according to an embodiment of the present invention.

The present invention may include three configuration modes.

According to a first configuration mode (Configuration Mode #1) L6010, which is an embodiment of the present invention, the first configuration mode may extract a static chain and a dynamic chain from an IR packet and convert the remainder of the corresponding packet into a general header compressed packet. The first configuration mode may extract a dynamic chain from an IR-DYN packet and convert the remainder of the corresponding packet into a general header compressed packet. The first configuration mode may transport the general header compressed packet without any change.

According to a second configuration mode (Configuration Mode #2) L6020, which is another embodiment of the present invention, the second configuration mode may extract only a static chain from an IR packet and convert the remainder of the corresponding packet into a general header compressed packet. The second configuration mode may extract a dynamic chain from an IR-DYN packet and convert the remainder of the corresponding packet into a general header compressed packet. The second configuration mode may transport the general header compressed packet without any change.

According to a third configuration mode (Configuration Mode #3) L6030, which is another embodiment of the present invention, the third configuration mode may extract a static chain from an IR packet and convert the remainder of the corresponding packet into an IR-DYN packet. The third configuration mode may transport the IR-DYN packet without any change and transport a general header compressed packet without any change.

Figure 7:
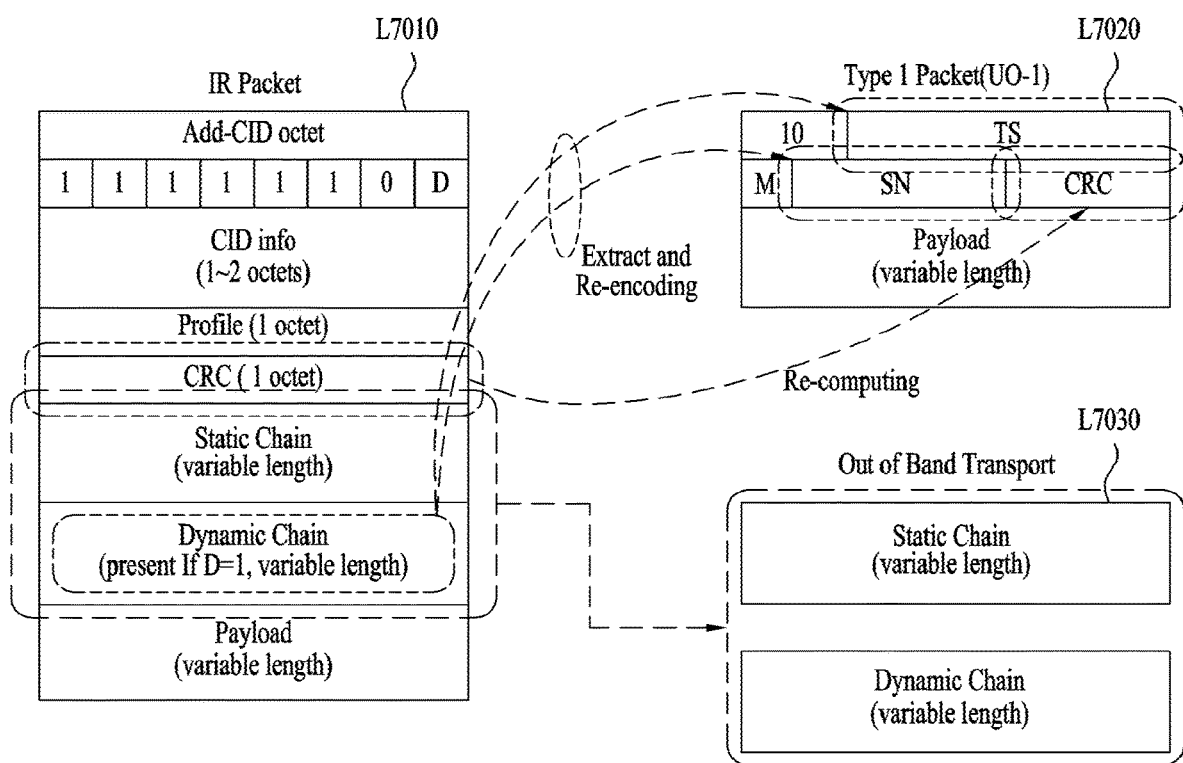
FIG. 7 is a view showing a procedure of converting an IR packet into a general header compressed packet in a procedure of reconfiguring an RoHC packet to configure a new packet stream according to an embodiment of the present invention.

FIG. 7 is a view showing a procedure of converting an IR packet into a general header compressed packet in a procedure of reconfiguring an RoHC packet to configure a new packet stream according to an embodiment of the present invention.

An IR packet L7010 according to an embodiment of the present invention may include packet type, context ID, Profile, CRC, Static Chain, Dynamic Chain, and/or Payload. Packet type may indicate type of the corresponding IR packet. For example, in this figure, the packet type of the IR packet may indicate 1111110D and the last D may indicate whether a dynamic chain is included in the corresponding packet. Context ID may use 8 bits or more bits. Context ID may identify a channel through which the corresponding packet is transported. Context ID may be named a context identifier (CID). When a compressor sends a packet having an uncompressed full header while a specific CID is added thereto first and sends subsequent packets while omitting header fields having static, dynamic, or inferred properties as the same CID, a decompressor may recover all RTP headers by adding the omitted field to the compression header received after the second packet with reference to initially stored header field information based on the CID. Profile may indicate a profile of the IR packet identified by the packet type. CRC may indicate a CRC code for error check. Static Chain may indicate information which is not almost changed during streaming. For example, IP version, IP source address, IP destination address, IP fragment flag, UDP source port, UDP destination port, etc. may be included in the static chain during IP streaming Dynamic Chain may indicate information which is changed at any time but is maintained for a predetermined time. Payload may include data to be transported.

A general header compressed packet L7020 according to an embodiment of the present invention may include Time Stamp (TS), Sequence Number (SN), CRC, and/or Payload. A general header compressed packet according to an embodiment of the present invention may correspond to a UO-1 packet corresponding to packet type 1. Time Stamp (TS) may indicate time stamp information for time synchronization. Sequence Number (SN) may indicate information indicating sequence of packets. CRC may indicate a CRC code for error check. Payload may include data to be transported.

According to an embodiment of the present invention, a static chain and a dynamic chain may be extracted from the IR packet L7010 and the extracted static chain and dynamic chain may be transported through Out of Band L7030. The Time Stamp (TS) and the Sequence Number (SN) included in the general header compressed packet L7020 may be re-encoded using information of the dynamic chain included in the IR packet L7010. The CRC included in the general header compressed packet L7020 may be re-calculated separately from the CRC included in the IR packet L7010.

Figure 8:
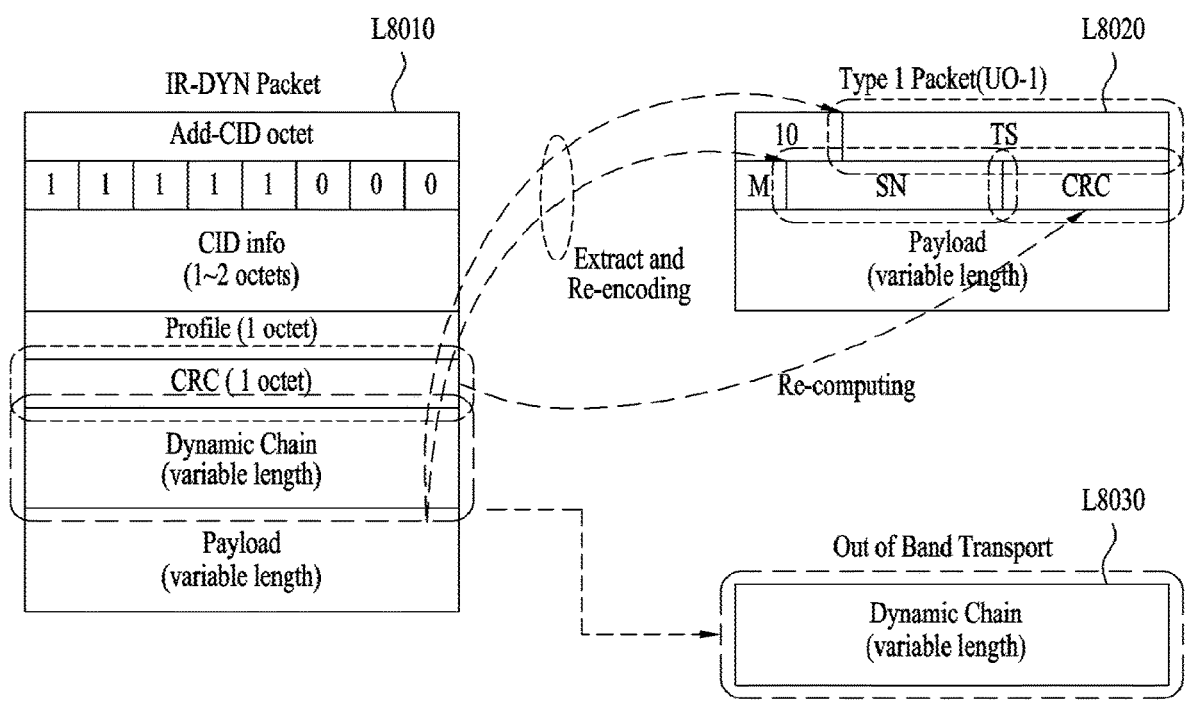
FIG. 8 is a view showing a procedure of converting an IR-DYN packet into a general header compressed packet in a procedure of reconfiguring an RoHC packet to configure a new packet stream according to an embodiment of the present invention.

FIG. 8 is a view showing a procedure of converting an IR-DYN packet into a general header compressed packet in a procedure of reconfiguring an RoHC packet to configure a new packet stream according to an embodiment of the present invention.

An IR-DYN packet L8010 according to an embodiment of the present invention may include packet type, context ID, Profile, CRC, Dynamic Chain, and/or Payload. Packet type may indicate type of the corresponding IR-DYN packet. For example, in this figure, the packet type of the IR-DYN packet may indicate 11111000. Context ID may use 8 bits or more bits. Context ID may identify a channel through which the corresponding IR-DYN packet is transported. Profile may indicate a profile of the IR-DYN packet identified by the packet type. CRC may indicate a CRC code for error check. Dynamic Chain may indicate information which is changed at any time but is maintained for a predetermined time. Payload may include data to be transported.

A general header compressed packet L8020 according to an embodiment of the present invention may include Time Stamp (TS), Sequence Number (SN), CRC, and/or Payload, which were previously described.

According to an embodiment of the present invention, a dynamic chain may be extracted from the IR-DYN packet L8010 and the extracted dynamic chain may be transported through Out of Band L8030. The Time Stamp (TS) and the Sequence Number (SN) included in the general header compressed packet L8020 may be re-encoded using information of the dynamic chain included in the IR-DYN packet L8010. The CRC included in the general header compressed packet L8020 may be re-calculated separately from the CRC included in the IR-DYN packet L8010.

Figure 9:
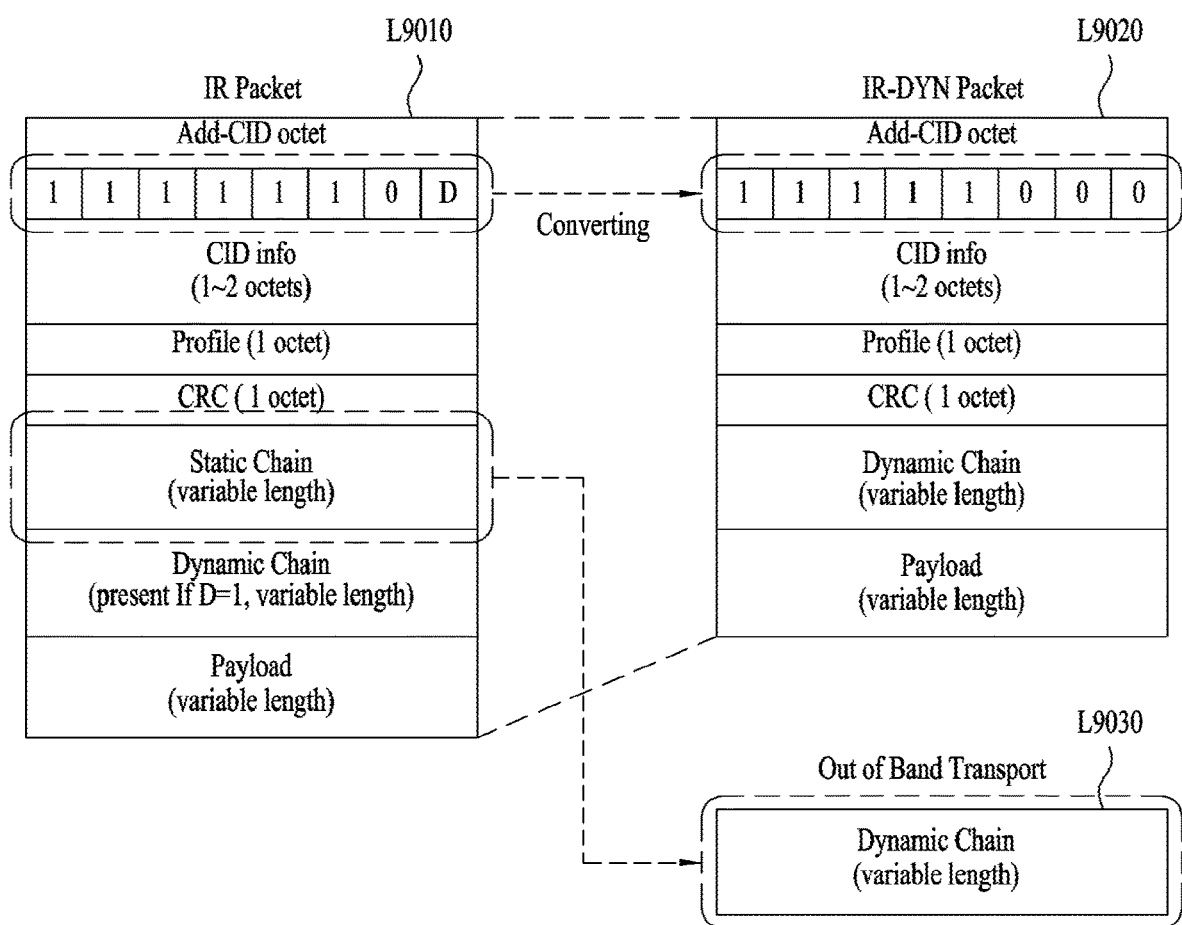
FIG. 9 is a view showing a procedure of converting an IR packet into an IR-DYN packet in a procedure of reconfiguring an RoHC packet to configure a new packet stream according to an embodiment of the present invention.

FIG. 9 is a view showing a procedure of converting an IR packet into an IR-DYN packet in a procedure of reconfiguring an RoHC packet to configure a new packet stream according to an embodiment of the present invention.

An IR packet L9010 and an IR-DYN packet L9020 according to an embodiment of the present invention were previously described in detail.

According to an embodiment of the present invention, packet type of the IR packet L9010 may be changed into a packet type value corresponding to the IR-DYN packet L9020. A static chain may be extracted from the IR packet L9010 and the extracted static chain may be transported through Out of Band L9030. The remaining fields included in the IR packet L9010 excluding the packet type and the static chain may be identically used in the IR-DYN packet L9020.

According to an embodiment of the present invention, encoding and calculation methods related to fields used in a procedure of reconfiguring an RoHC packet to configure a new packet stream may conform to a related standard document or other methods may be applied.

Figure 10:
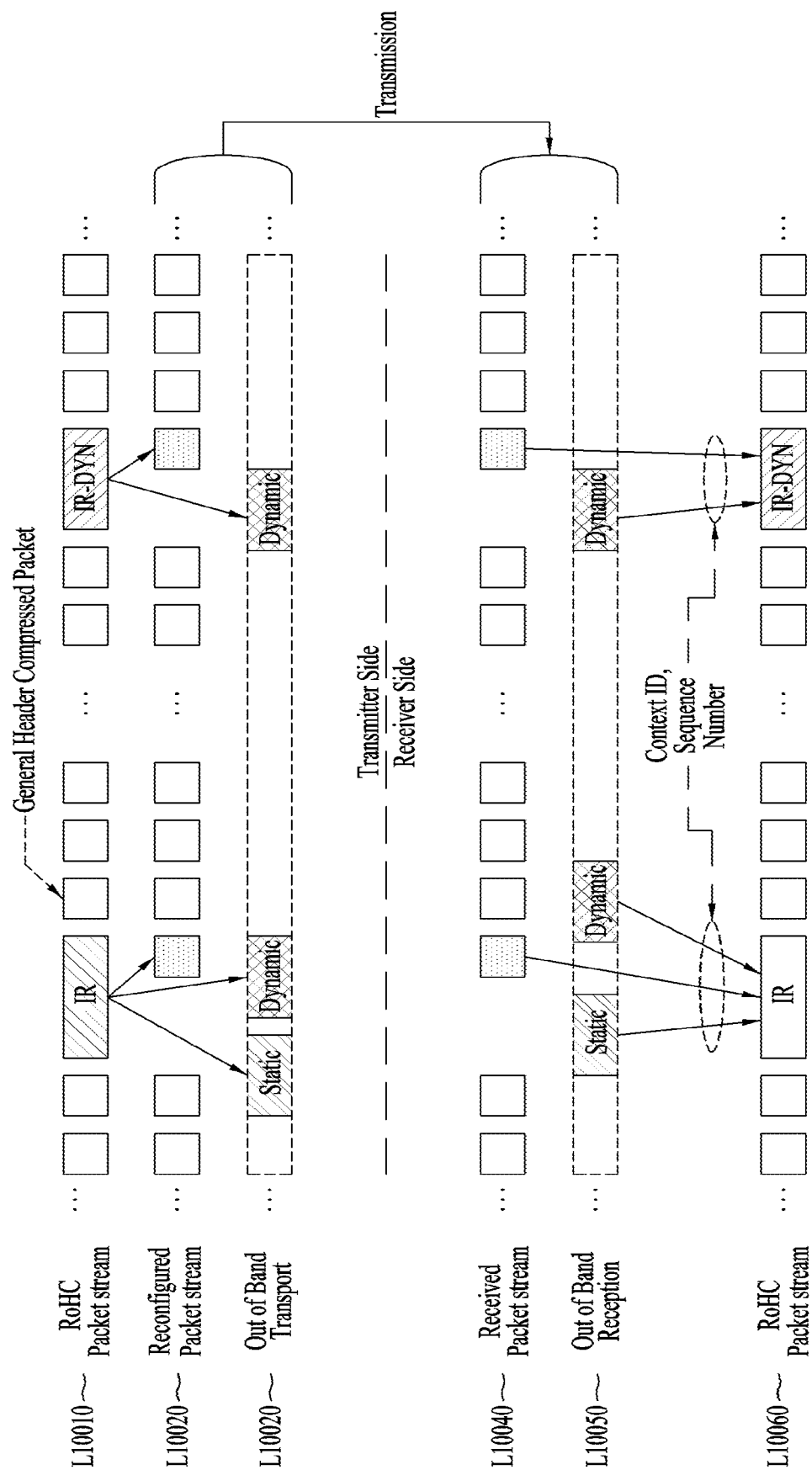
FIG. 10 is a view showing a configuration and recovery procedure of an RoHC packet stream in a first configuration mode (Configuration Mode #1) according to an embodiment of the present invention.

FIG. 10 is a view showing a configuration and recovery procedure of an RoHC packet stream in a first configuration mode (Configuration Mode #1) according to an embodiment of the present invention.

A configuration procedure of an RoHC packet stream in a transmitter according to an embodiment of the present invention is as follows.

A transmitter according to an embodiment of the present invention may detect an IR packet and an IR-DYN packet from an RoHC packet stream L10010 based on RoHC header information. Next, the transmitter may generate a general header compressed packet using sequence number included in the IR and IR-DYN packets. The general header compressed packet may be arbitrarily generated since the general header compressed packet includes Sequence Number (SN) information irrespective of which type the general header compressed packet has. SN may correspond to information basically present in RTP. For UDP, the transmitter may arbitrarily generate and use SN. Next, the transmitter may replace the corresponding IR or IR-DYN packet with the generated general header compressed packet. The transmitter may extract a static chain and a dynamic chain from the IR packet and extract a dynamic chain from the IR-DYN packet. The extracted static chain and dynamic chain may be transported through Out of Band L10030. For all RoHC packet streams, the transmitter may replace headers of the IR and IR-DYN packets with a header of the general header compressed packet through the same procedure as the above-described procedure and extract a static chain and/or a dynamic chain. A reconfigured packet stream L10020 may be transported through a data pipe and the extracted static chain and dynamic chain may be transported through Out of Band L10030.

A recovery procedure of an RoHC packet stream in a receiver according to an embodiment of the present invention is as follows.

A receiver according to an embodiment of the present invention may select a data pipe of a stream to be received using signaling information. Next, the receiver may receive a packet stream to be received, transported through the data pipe (Received Packet Stream, L10040), and detect a static chain and a dynamic chain corresponding to the packet stream to be received. The static chain and/or the dynamic chain may be received through Out of Band (Out of Band Reception, L10050). Next, the receiver may detect a general header compressed packet having the same SN as the above-described static chain or dynamic chain from the pack stream transported through the data pipe using SN of the extracted static chain and dynamic chain. Next, the receiver may combine the detected general header compressed packet with the static chain and/or the dynamic chain to configure an IR and/or IR-DYN packet. The configured IR and/or IR-DYN packet may be transported to an RoHC decompressor. In addition, the receiver may configure an RoHC packet stream L10060 including an IR packet, an IR-DYN packet, and/or a general header compressed packet. The configured RoHC packet stream may be transported to the RoHC decompressor. A receiver according to an embodiment of the present invention may use static chain, dynamic chain, and SN and/or Context ID of an IR packet and an IR-DYN packet to recover an RoHC packet stream.

Figure 11:
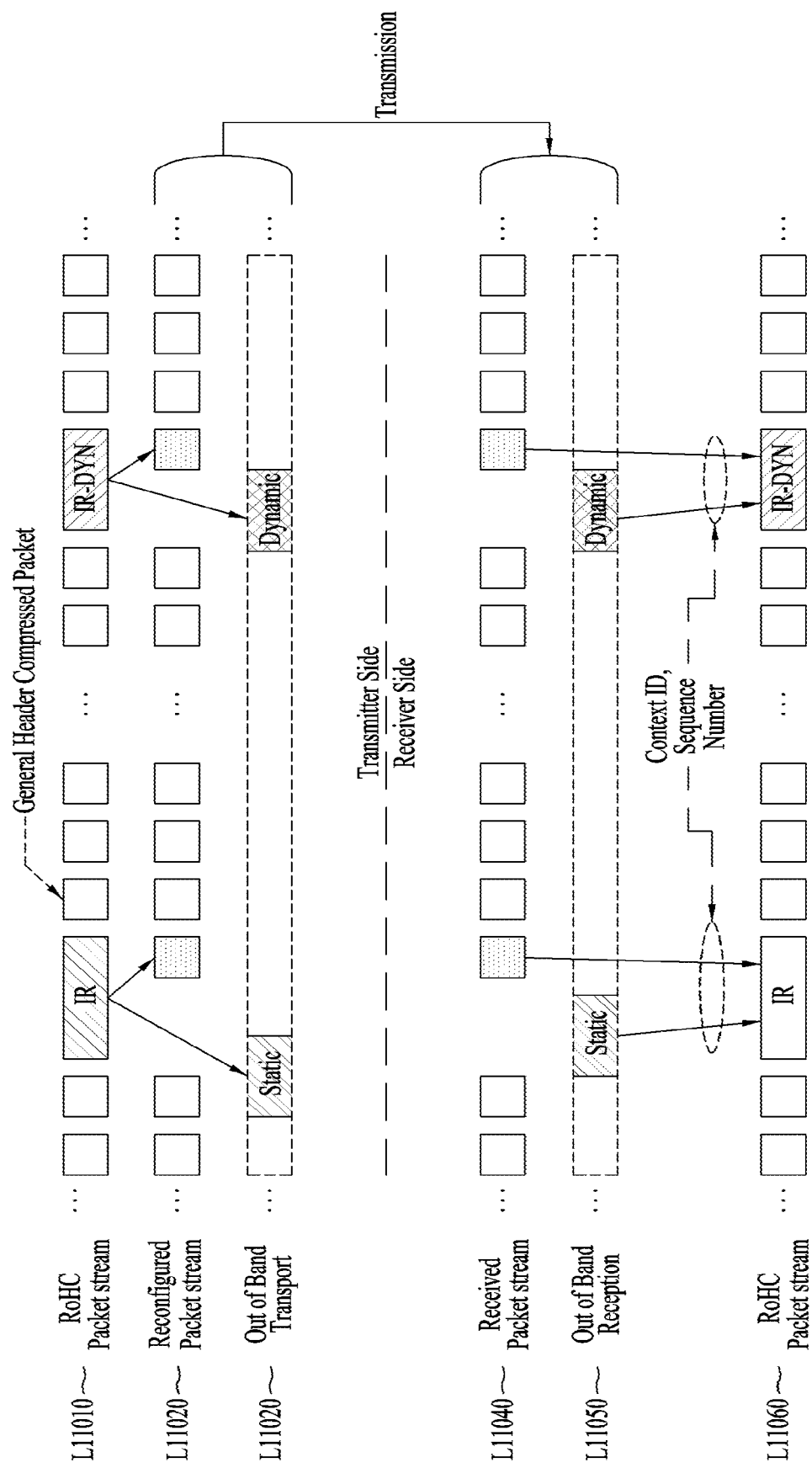
FIG. 11 is a view showing a configuration and recovery procedure of an RoHC packet stream in a second configuration mode (Configuration Mode #2) according to an embodiment of the present invention.

FIG. 11 is a view showing a configuration and recovery procedure of an RoHC packet stream in a second configuration mode (Configuration Mode #2) according to an embodiment of the present invention.

A configuration procedure of an RoHC packet stream in a transmitter according to an embodiment of the present invention is as follows.

A transmitter according to an embodiment of the present invention may detect an IR packet and an IR-DYN packet from an RoHC packet stream L11010 based on RoHC header information. Next, the transmitter may generate a general header compressed packet using sequence number included in the IR and IR-DYN packets. The general header compressed packet may be arbitrarily generated since the general header compressed packet includes Sequence Number (SN) information irrespective of which type the general header compressed packet has. SN may correspond to information basically present in RTP. For UDP, the transmitter may arbitrarily generate and use SN. Next, the transmitter may replace the corresponding IR or IR-DYN packet with the generated general header compressed packet. The transmitter may extract a static chain from the IR packet and extract a dynamic chain from the IR-DYN packet. The extracted static chain and dynamic chain may be transported through Out of Band L11030. For all RoHC packet streams, the transmitter may replace headers of the IR and IR-DYN packets with a header of the general header compressed packet through the same procedure as the above-described procedure and extract a static chain and/or a dynamic chain. A reconfigured packet stream L11020 may be transported through a data pipe and the extracted static chain and dynamic chain may be transported through Out of Band L11030.

A recovery procedure of an RoHC packet stream in a receiver according to an embodiment of the present invention is as follows.

A receiver according to an embodiment of the present invention may select a data pipe of a stream to be received using signaling information. Next, the receiver may receive a packet stream to be received, transported through the data pipe (Received Packet Stream, L11040), and detect a static chain and a dynamic chain corresponding to the packet stream to be received. The static chain and/or the dynamic chain may be received through Out of Band (Out of Band Reception, L11050). Next, the receiver may detect a general header compressed packet having the same SN as the above-described static chain or dynamic chain from the pack stream transported through the data pipe using SN of the extracted static chain and dynamic chain. Next, the receiver may combine the detected general header compressed packet with the static chain and/or the dynamic chain to configure an IR and/or IR-DYN packet. The configured IR and/or IR-DYN packet may be transported to an RoHC decompressor. In addition, the receiver may configure an RoHC packet stream L11060 including an IR packet, an IR-DYN packet, and/or a general header compressed packet. The configured RoHC packet stream may be transported to the RoHC decompressor. A receiver according to an embodiment of the present invention may use static chain, dynamic chain, and SN and/or Context ID of an IR packet and an IR-DYN packet to recover an RoHC packet stream.

FIG. 12 is a view showing a configuration and recovery procedure of an RoHC packet stream in a third configuration mode (Configuration Mode #3) according to an embodiment of the present invention.

A configuration procedure of an RoHC packet stream in a transmitter according to an embodiment of the present invention is as follows.

A transmitter according to an embodiment of the present invention may detect an IR packet from an RoHC packet stream L12010 based on RoHC header information. Next, the transmitter may extract a static chain from the IR packet and convert the IR packet into an IR-DYN packet using the remainder of the IR packet excluding the extracted static chain. For all RoHC packet streams, the transmitter may replace a header of the IR packet with a header of the IR-DYN packet through the same procedure as the above-described procedure and extract a static chain. A reconfigured packet stream L12020 may be transported through a data pipe and the extracted static chain may be transported through Out of Band L12030.

A recovery procedure of an RoHC packet stream in a receiver according to an embodiment of the present invention is as follows.

A receiver according to an embodiment of the present invention may select a data pipe of a stream to be received using signaling information. Next, the receiver may receive a packet stream to be received, transported through the data pipe (Received Packet Stream, L12040), and detect a static chain corresponding to the packet stream to be received. The static chain may be received through Out of Band (Out of Band Reception, L12050). Next, the receiver may detect an IR-DYN packet from the pack stream transported through the data pipe. Next, the receiver may combine the detected IR-DYN packet with the static chain to configure an IR packet. The configured IR packet may be transported to an RoHC decompressor. In addition, the receiver may configure an RoHC packet stream L12060 including an IR packet, an IR-DYN packet, and/or a general header compressed packet. The configured RoHC packet stream may be transported to the RoHC decompressor. A receiver according to an embodiment of the present invention may use static chain and SN and/or Context ID of an IR-DYN packet to recover an RoHC packet stream.

FIG. 13 is a view showing a combination of information that can be delivered through Out of Band according to an embodiment of the present invention.

According to an embodiment of the present invention, a method of delivering a static chain and/or a dynamic chain extracted in a configuration procedure of an RoHC packet stream through Out of Band may mainly include a delivering method through signaling and a delivering method through a data pipe, through which a parameter necessary for system decoding is delivered. According to an embodiment of the present invention, the data pipe, through which the parameter necessary for the system decoding is delivered, may be named Base Data Pipe (DP).

As shown in this figure, a static chain and/or a dynamic chain may be delivered through signaling or Base DP. According to an embodiment of the present invention, a first transport mode (Transport Mode #1) to a third transport mode (Transport Mode #3) may be used in the first configuration mode (Configuration Mode #1) or the second configuration mode (Configuration Mode #2), and a fourth transport mode (Transport Mode #4) and a fifth third transport mode (Transport Mode #5) may be used in the third configuration mode (Configuration Mode #3).

According to an embodiment of the present invention, each configuration mode and transport mode may be switched and used through separate signaling based on a situation of the system, and only one configuration mode and one transport mode may be fixed and used according to a design procedure of the system.

As shown in this figure, in the first transport mode (Transport Mode #1), a static chain may be transported through signaling, a dynamic chain may be transported through signaling, and a general header compressed packet may be transported through Normal Data Pipe.

As shown in this figure, in the second transport mode (Transport Mode #2), a static chain may be transported through signaling, a dynamic chain may be transported through Base Data Pipe, and a general header compressed packet may be transported through Normal Data Pipe.

As shown in this figure, in the third transport mode (Transport Mode #3), a static chain may be transported through Base Data Pipe, a dynamic chain may be transported through Base Data Pipe, and a general header compressed packet may be transported through Normal Data Pipe.

As shown in this figure, in the fourth transport mode (Transport Mode #4), a static chain may be transported through signaling, a dynamic chain may be transported through Normal Data Pipe, and a general header compressed packet may be transported through Normal Data Pipe. At this time, the dynamic chain may be transported by an IR-DYN packet.

As shown in this figure, in the fifth transport mode (Transport Mode #5), a static chain may be transported through Base Data Pipe, a dynamic chain may be transported through Normal Data Pipe, and a general header compressed packet may be transported through Normal Data Pipe. At this time, the dynamic chain may be transported by an IR-DYN packet.

FIG. 14 is a view showing configuration of a descriptor including a static chain according to an embodiment of the present invention.

According to an embodiment of the present invention, a transport format for transport through signaling may be needed to transport a static chain through signaling, to which a descriptor form may correspond.

A descriptor including a static chain according to an embodiment of the present invention may include a descriptor_tag field, a descriptor_length field, a context_id field, a context_profile field, a static_chain_length field, and/or a static_chain( ) field.

The descriptor_tag field may indicate that this descriptor is a descriptor including a static chain.

The descriptor_length field may indicate a length of this descriptor.

The context_id field may indicate context ID for a corresponding RoHC packet stream. The length of context ID may be decided in an initial configuration procedure of the system. This field may be named context identifier information and identify a corresponding RoHC packet stream based on a static field or a dynamic field.

The context_profile field may indicate compression protocol information of a corresponding RoHC packet stream. That is, this field may indicate up to which protocol a header of an RoHC packet included in the corresponding RoHC packet stream has been compressed.

The static_chain_length field may indicate the length of following static chain( ) in unit of byte. In a case in which this descriptor includes only one static chain, this field may be replaced by the above-described descriptor_length field.

The static_chain( ) field may include information for the static chain.

FIG. 15 is a view showing configuration of a descriptor including a dynamic chain according to an embodiment of the present invention.

According to an embodiment of the present invention, a transport format for transport through signaling may be needed to transport a dynamic chain through signaling, to which a descriptor form may correspond.

A descriptor including a dynamic chain according to an embodiment of the present invention may include a descriptor_tag field, a descriptor_length field, a context_id field, a context_profile field, a dynamic_chain_length field, and/or a dynamic_chain( ) field.

The descriptor_tag field may indicate that this descriptor is a descriptor including a dynamic chain.

The descriptor_length field may indicate a length of this descriptor.

The context_id field may indicate context ID for a corresponding RoHC packet stream. The length of context ID may be decided in an initial configuration procedure of the system.

The context_profile field may indicate compression protocol information of a corresponding RoHC packet stream.

The dynamic_chain_length field may indicate the length of following dynamic chain( ) in unit of byte. In a case in which this descriptor includes only one dynamic chain, this field may be replaced by the above-described descriptor_length field.

The dynamic_chain( ) field may include information for the dynamic chain.

FIG. 16 is a view showing configuration of a packet format including a static chain and a packet format including a dynamic chain according to an embodiment of the present invention.

According to an embodiment of the present invention, a transport format for transport in a packet form may be needed to transport a static chain and/or a dynamic chain through Base DP, to which a packet format form shown in this figure may correspond.

In order to configure a static chain and/or a dynamic chain according to an embodiment of the present invention in a packet format, a header for informing of information about the corresponding static chain and/or dynamic chain may be added. The added header may include a Packet Type field, a Static/Dynamic chain Indicator field, and a Payload Length field. In a case in which a packet according to an embodiment of the present invention has a structure in which it is difficult to indicate a static chain and/or a dynamic chain in detail, the information of the above-described descriptor including the static chain or the dynamic chain may be included in a payload of this packet A packet format including a static chain according to an embodiment of the present invention may include a Packet Type field, a Static chain Indicator field, a Payload Length field, and/or a Static Chain Byte field.

The Packet Type field may indicate type information of this packet.

The Static chain Indicator field may indicate whether information constituting a payload is a static chain or a dynamic chain.

The Payload Length field may indicate the length of a payload including a static chain.

The Static Chain Byte field may indicate information of the static chain included in the payload of this packet.

A packet format including a dynamic chain according to an embodiment of the present invention may include a Packet Type field, a Dynamic chain Indicator field, a Payload Length field, and/or a Dynamic Chain Byte field.

The Packet Type field may indicate type information of this packet.

The Dynamic chain Indicator field may indicate whether information constituting a payload is a static chain or a dynamic chain.

The Payload Length field may indicate the length of a payload including a dynamic chain.

The Dynamic Chain Byte field may indicate information of the dynamic chain included in the payload of this packet.

FIG. 17 is a diagram illustrating configuration of ROHC_init_descriptor( ) according to an embodiment of the present invention.

Robust header compression (RoHC) according to an embodiment of the present invention may be configured for a bidirectional transmission system. In the bidirectional transmission system, a RoHC compressor and a RoHC decompressor according to an embodiment of the present invention may perform an initial set up procedure and in this procedure, transmit and receive a parameter required for the initial procedure. According to an embodiment of the present invention, the procedure for transmitting and receiving the parameter required for aforementioned initial procedure can be referred as a negotiation procedure or an initialization procedure. However, according to an embodiment of the present invention, a unidirectional system such as a broadcast system cannot perform the aforementioned negotiation procedure and can replace the aforementioned initialization procedure with a separate method.

According to an embodiment of the present invention, during the initialization procedure, the RoHC compressor and the RoHC decompressor may transmit and receive the following parameters. The parameter required for the initial procedure according to an embodiment of the present invention may include MAX_CID, LARGE_CIDS, PROFILES, FEEDBACK_FOR, and/or MRRU.

MAX_CID may be used to notify the decompressor of a maximum value of a context ID (CID).

LARGE_CIDS may indicate whether a short CID (0 to 15 (decimal number)) and an embedded CID (0 to 16383 (decimal number)) are used for configuration of the CID. Thus, a size of a byte for representation of the CID may also be determined.

PROFILES may indicate a range of a protocol for header compression via RoHC. According to an embodiment of the present invention, RoHC can compress and restore a stream when the compressor and the decompressor have the same profile.

FEEDBACK_FOR may correspond to an optionally used field and indicate whether a backward channel for transmission of feedback information is present in a corresponding RoHC channel.

A maximum reconstructed reception unit (MRRU) may indicate a maximum size of a segment when segmentation is used in the RoHC compressor.

According to an embodiment of the present invention, a descriptor including parameters may be transmitted in order to transmit a parameter required for the aforementioned RoHC initial procedure.

According to an embodiment of the present invention, ROHC_init_descriptor( ) may include a descriptor_tag field, a descriptor_length field, a context_id field, a context_profile field, a max_cid field, and/or a large_cid field.

The descriptor_tag field may identify whether the descriptor is a descriptor including a parameter required for a RoHC initial procedure.

The descriptor_length field may indicate a length of the descriptor.

The context_id field may indicate a CID of a corresponding RoHC packet stream.

The context_profile field may be a field including the aforementioned PROFILES parameter and indicate a range of a protocol for header compression via RoHC.

The max_cid field may be a field including the aforementioned MAX_CID parameter and may indicate a maximum value of a CID.

The large_cid field may be a field including the aforementioned LARGE_CIDS parameter and may indicate whether a short CID (0 to 15 (decimal number)) and an embedded CID (0 to 16383 (decimal number)) are used for configuration of the CID.

According to an embodiment of the present invention, ROHC_init_descriptor( ) may include the aforementioned FEEDBACK_FOR parameter and/or MRRU parameter.

FIG. 18 is a diagram illustrating configuration of Fast_Information_Chunk( ) including ROHC_init_descriptor( ) according to an embodiment of the present invention.

ROHC_init_descriptor( ) according to an embodiment of the present invention may be transmitted through a fast information channel (FIC). In this case, ROHC_init_descriptor( ) may be included in Fast_Information_Chunk( ) and transmitted. According to an embodiment of the present invention, ROHC_init_descriptor( ) may be included in a service level of Fast_Information_Chunk( ) and transmitted.

A field included in Fast_Information_Chunk( ) including ROHC_init_descriptor( ) according to an embodiment of the present invention has been described above.

ROHC_init_descriptor( ) according to an embodiment of the present invention may be changed in its term according to system configuration and changed in its size according to a system optimization situation.

Fast_Information_Chunk( ) according to an embodiment of the present invention may be referred to as fast information chunk.

FIG. 19 is a diagram illustrating configuration of Fast_Information_Chunk( ) including a parameter required for a RoHC initial procedure according to an embodiment of the present invention.

The parameter required for the RoHC initial procedure according to an embodiment of the present invention may be transmitted through a fast information channel (FIC). In this case, the parameter required for the RoHC initial procedure may be included in Fast_Information_Chunk( ) and transmitted. According to an embodiment of the present invention, the parameter required for the RoHC initial procedure may be included in a service level of Fast_Information_Chunk( ) and transmitted.

A field included in Fast_Information_Chunk( ) including the parameter required for the RoHC initial procedure according to an embodiment of the present invention has been described above.

The parameter required for the RoHC initial procedure according to an embodiment of the present invention may be changed in its term according to system configuration and changed in its size according to a system optimization situation.

FIG. 20 is a diagram illustrating configuration of Fast_Information_Chunk( ) including ROHC_init_descriptor( ) according to another embodiment of the present invention.

According to an embodiment of the present invention, when important information about a component included in a broadcast service is included in Fast_Information_Chunk( ) and transmitted, ROHC_init_descriptor( ) may be included in a component level of Fast_Information_Chunk( ) and transmitted. That is, ROHC_init_descriptor( ) may be transmitted for each respective component included in Fast_Information_Chunk( ).

A field included in Fast_Information_Chunk( ) including ROHC_init_descriptor( ) according to another embodiment of the present invention has been described above.

ROHC_init_descriptor( ) according to an embodiment of the present invention may be changed in its term according to system configuration and changed in its size according to a system optimization situation.

FIG. 21 is a diagram illustrating configuration of Fast_Information_Chunk( ) including a parameter required for a RoHC initial procedure according to another embodiment of the present invention.

According to an embodiment of the present invention, when important information about a component included in a broadcast service is included in Fast_Information_Chunk( ) and transmitted, a parameter required for the RoHC initial procedure may be included in a component level of Fast_Information_Chunk( ) and transmitted. That is, the parameter required for the RoHC initial procedure may be transmitted or each respective component included in Fast_Information_Chunk( ).

A field included in Fast_Information_Chunk( ) including a parameter required for the RoHC initial procedure according to another embodiment of the present invention has been described above.

The parameter required for the RoHC initial procedure according to an embodiment of the present invention may be changed in its term according to system configuration and changed in its size according to a system optimization situation.

Figure 22:
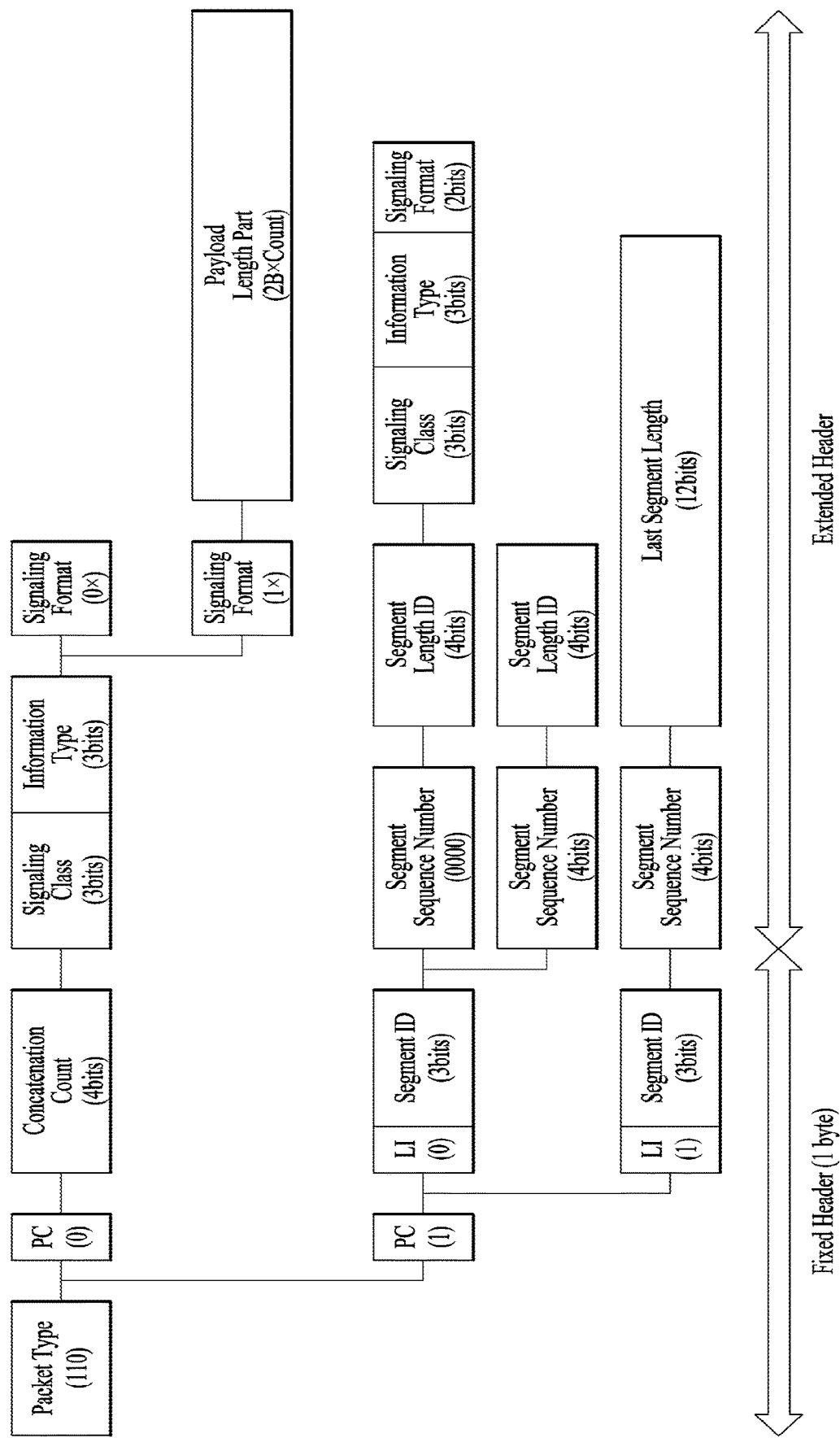
FIG. 22 illustrates a configuration of a header of a packet for signaling according to an embodiment of the present invention.

FIG. 22 illustrates a configuration of a header of a packet for signaling according to an embodiment of the present invention. The packet for signaling according to the present embodiment may be referred to as a link layer packet or a signaling packet. The link layer packet according to the present embodiment may include a link layer packet header and a link layer packet payload. In addition, as illustrated in FIG. 22, a packet header of the link layer packet according to the present embodiment may include a fixed header and an extended header. A length of the fixed header may be restricted to 1 byte. Therefore, in an embodiment of the present invention, additional signaling information may be transmitted through the extended header. The fixed header may include a 3-bit packet type field and a 1-bit packet configuration (PC) field. FIG. 22 illustrates a relation between fields and signaling fields transmitted through the fixed header and the extended header included in the link layer packet when the packet type field is set to "110". Hereinafter, a description will be given of the signaling fields included in FIG. 22.

The fixed header and/or the extended header according to the present embodiment may have a configuration varying with a value of the PC field.

The PC field is a field that indicates a packet configuration. In particular, the PC field may indicate processing of signaling information (or data) which is included in the link layer packet payload and/or the length of the extended header information according to the processing of signaling information (or data).

When the PC field has a value "0", the fixed header may include a 4-bit concatenation count field.

The concatenation count field is a field that is present when only a descriptor other than a section table is transmitted as a signal. The concatenation count (count) field indicates the number of descriptors included in the link layer packet payload. According to the present embodiment, descriptors, the number of which equals a value obtained by adding 1 to a value of the concatenation count (count) field, may be included in one link layer packet payload. Therefore, since the number of bits allocated to the concatenation count (count) field corresponds to 3 bits, signaling may be performed such that a maximum of eight descriptors are configured as one link layer packet.

When the PC field has a value of "1", the fixed header may include a 1-bit last segment indicator (LI) field and a 3-bit segment ID field.

The LI field may indicate whether the link layer packet includes last segmentation signaling data. In other words, signaling data may be segmented and transmitted. When the LI field has a value of "0", the value indicates that signaling data included in a current link layer packet does not correspond to a last segment. When the LI field has a value of "1", the value indicates that the signaling data included in the current link layer packet corresponds to the last segment.

The segment ID field may indicate an ID for identification of a segment when signaling data is segmented.

The extended header according to the present embodiment may have a configuration varying with the configuration of the fixed header.

However, as illustrated in the figure, the extended header according to the present embodiment may include a signaling class field, an information type field, and a signaling format field irrespective of the configuration of the fixed header. The field that is included in the extended header according to an embodiment of the present invention may be applied other layers. This may be changed by a designer.

The signaling class field according to the present embodiment may indicate a class of signaling included in the link layer packet payload. Specifically, the packet header according to the present embodiment may be used for one of signaling for channel scan and service acquisition, signaling for emergency alert, and signaling for header compression. When each of the signaling instances is used, the link layer packet payload according to the present embodiment may transmit associated signaling information. In addition, the signaling class field according to the present embodiment may have a length of 3 bits, which may be changed by a designer. Details will be described below.

The information type field according to the present embodiment may have a length of 2 bits or 3 bits, and indicate a type of signaling information included in the link layer packet payload. This may be changed by a designer. Details will be described below.

The signaling format field according to the present embodiment may have a length of 3 bits, which may be changed by a designer.

As described in the foregoing, when the PC field has a value of "0", the extended header according to the present embodiment may include the signaling class field, the information type field, and the signaling format field. In this case, the extended header according to the present embodiment may include a payload length part field according to a value of the signaling format field.

A value that indicates a whole length of the link layer packet or a value that indicates a length of the payload of the link layer packet may be allocated to the above-described payload length part field depending on system configuration.

In addition, when the PC field has a value of "1", the extended header according to the present embodiment may include a 4-bit segment sequence number (Seg_SN) field.

When the LI field has a value of "0", the extended header according to the present embodiment may include a 4-bit Seg_SN field, a 4-bit segment length ID field, the signaling class field, the information type field, and the signaling format field.

When the signaling data is segmented, the segment sequence number field indicates an order of respective segments. A head of the signaling data includes an index of a corresponding data table, and thus the respective segments segmented when a receiver receives the packet need to be aligned in order. Link layer packets having payloads segmented from one piece of signaling data have the same segment ID and may have different segment sequence numbers.

The segment length ID field may indicate a length of a corresponding segment.

When the LI field has a value of "1", the extended header according to the present embodiment may include a 4-bit Seg_SN field and a 12-bit last segment length field. The Seg_SN field may indicate an order of a segment corresponding to a last segment ID, and the last segment length field may indicate a length of the corresponding segment.

FIG. 23 is a chart that defines the signaling class field according to the present embodiment.

A left column of the chart indicates a value of a 3-bit signaling class field, and a right column of the chart indicates a description of a type of signaling of a packet header indicated by a value of each signaling class field.

Hereinafter, a description will be given of the value of each signaling class field.

When the signaling class field has a value of "000", signaling of the packet payload corresponds to the signaling for channel scan and service acquisition. As illustrated in the figure, the description may correspond to "Signaling for Channel Scan and Service Acquisition". In this case, the link layer packet payload may transmit signaling information related to channel scan and service acquisition.

When the signaling class field has a value of "001", signaling of the packet header corresponds to the signaling for emergency alert. As illustrated in the figure, the description may correspond to "Signaling for Emergency Alert". In this case, the link layer packet payload may transmit signaling information related to emergency alert.

When the signaling class field has a value of "010", signaling of the packet header corresponds to the signaling for header compression. As illustrated in the figure, the description may correspond to "Signaling for Header Compression". In this case, the link layer packet payload may transmit signaling information related to header compression.

When the signaling class field has values of "011" to "110", the packet header may be used for another type of signaling in the future. In this case, the description may correspond to "Reserved". In this case, the link layer packet payload according to the present embodiment may transmit information corresponding to signaling other than a signaling class proposed by the present invention in the future. A value corresponding to one of "011" to "110" may be allocated to the signaling class field.

When the signaling class field has a value of "111", the packet header may be used for two or more types of the above-described signaling. In this case, the description may correspond to "Various". Therefore, the link layer packet payload according to the present embodiment may transmit information corresponding to signaling which corresponds to two or more signaling classes.

FIG. 22 corresponds to a case used for the signaling for header compression. Here, the signaling class field corresponds to a value of "010".

FIG. 24 is a chart that defines an information type.

A left column of the chart indicates a value of a 3-bit information type field, and a right column of the chart indicates a description of a type of information transmitted by the packet payload indicated by a value of each information type field.

Specifically, FIG. 24 is a chart that defines an information type when the signaling class field according to the present embodiment has a value of "010". The information type may be indicated by a length of 3 bits. In addition, the information type may indicate a type of signaling information included in the link layer packet payload.

The description of each information type is as shown in the chart. Hereinafter, a value of the information type field will be described.

When the information type field has a value of "000", the description may correspond to "Initialization Information". In this case, the link layer packet payload may include signaling information related to initialization information.

When the information type field has a value of "001", the description may correspond to "Configuration Parameters". In this case, the link layer packet payload may include signaling information related to configuration parameters.

When the information type field has a value of "010", the description may correspond to "Static Chain" In this case, the link layer packet payload may include signaling information related to a static chain.

When the information type field has a value of "011", the description may correspond to "Dynamic Chain".

FIG. 25 is a diagram illustrating a structure of Payload_for_Initialization( ) according to an embodiment of the present invention when an information type for header compression has a value of "000".

The initialization information may include information about a configuration of an RoHC channel between a compressor and a decompressor. The RoHC channel may transmit one or more context information items. All contexts transmitted by the RoHC channel may include common information. The RoHC channel may include one or a plurality of DPs.

Payload_for_Initialization( ) according to the present embodiment may include a num_RoHC_channels field, an RoHC_channel_id field, a max_cid field, a large_cids field, a num_profiles field, a profiles( ) field, a num_IP_stream field, and an IP_address( ) field.

The num_RoHC_channels field may indicate the number of RoHC channels for transmission of packets to which RoHC is applied. An RoHC channel may include one or a plurality of DPs. When the RoHC channel includes one DP, RoHC channel information may be replaced based on information of the DP. In this case, the num_RoHC_channels field may be replaced by a num_DP field.

The RoHC_channel_id field may indicate an ID of an RoHC channel for transmission of packets to which RoHC is applied. When the RoHC channel includes one DP, the RoHC_channel_id field may be replaced by a DP_id field.

The max_cid field may indicate a maximum value of a CID. A value of the max_cid field may be input to the decompressor.

The large_cids field includes the above-described large_cids field, and may indicate whether a short CID (0 to 15 (decimal number)) is used or an embedded CID (0 to 16383 (decimal number)) is used in a configuration of the CID.

The num_profiles field may include the number of profiles supportable by the RoHC channel.

The profiles( ) field may indicate a range of a header compression protocol in an RoHC process according to an embodiment of the present invention. In the RoHC process according to the present embodiment, the compressor may compress RoHC packets having the same profile into a stream, and the decompressor may restore the RoHC packets.

The num_IP_stream field may indicate the number of IP streams transmitted through the RoHC channel.

The IP_address field may indicate a destination address of a filtered IP stream which is input to an RoHC compressor.

FIG. 26 is a diagram illustrating a structure of Payload_for_ROHC_configuration( ) when the information type for header compression has a value of "001".

Payload_for_ROHC_configuration( ) according to the present embodiment may include a configuration parameter. The configuration parameter may indicate a configuration of each packet and a transmission mode of a context.

The configuration parameter according to the present embodiment may correspond to a field included in Payload_for_ROHC_configuration( ). The configuration parameter may indicate a packet configuration of each context and/or a transmission mode (transport mode) of the context. In this case, RoHC_channel_id may be used to identify the same context_ids transmitted through different RoHC channels.

Payload_for_ROHC_configuration( ) according to the present embodiment may include an RoHC_channel_id field, a context_id field, a packet_configuration_mode field, a context_transmission_mode field, and a context_profile field.

The context_id field may indicate a context ID of a corresponding RoHC packet stream. A length of the context ID may be determined in an initial process of configuring a system. Therefore, the length may be determined based on a structure of Payload_for_Initialization( ) according to the present embodiment.

The packet_configuration_mode field may indicate a configuration mode of a packet stream including a corresponding context.

The context_transmission_mode field indicates a transmission mode of a corresponding context, which is identical to the above-described transmission mode (or transport mode).

Description of the RoHC_channel_id field and the context_profile field included in Payload_for_ROHC_configuration( ) according to the present embodiment is similar to the above description.

FIG. 27 is a diagram illustrating a structure of Payload_for_static_chain( ) when the information type for header compression has a value of "010".

Payload_for_static_chain( ) according to the present embodiment may include a context_id field, a context_profile field, a static_chain_length field, a static_chain( ) field, a dynamic_chain_incl field, a dynamic_chain_length field, and a dynamic_chain_byte field.

The dynamic_chain_incl field may indicate whether information about a dynamic chain is transmitted together with information about a static chain. Description of the context_id field, the context_profile field, the static_chain_length field, the static_chain( ) field, the dynamic_chain_length field, and the dynamic_chain_byte field included in Payload_for_static_chain( ) according to the present embodiment is similar to the above description.

FIG. 28 is a diagram illustrating a structure of Payload_for_dynamic_chain( ) when the information type for header compression has a value of "011".

Payload_for_dynamic_chain( ) according to the present embodiment may include a context_id field, a context_profile field, a dynamic_chain_length field, and a dynamic_chain_byte field.

Description of the fields included in Payload_for_dynamic_chain( ) according to the present embodiment is similar to the above description.

Figure 29:
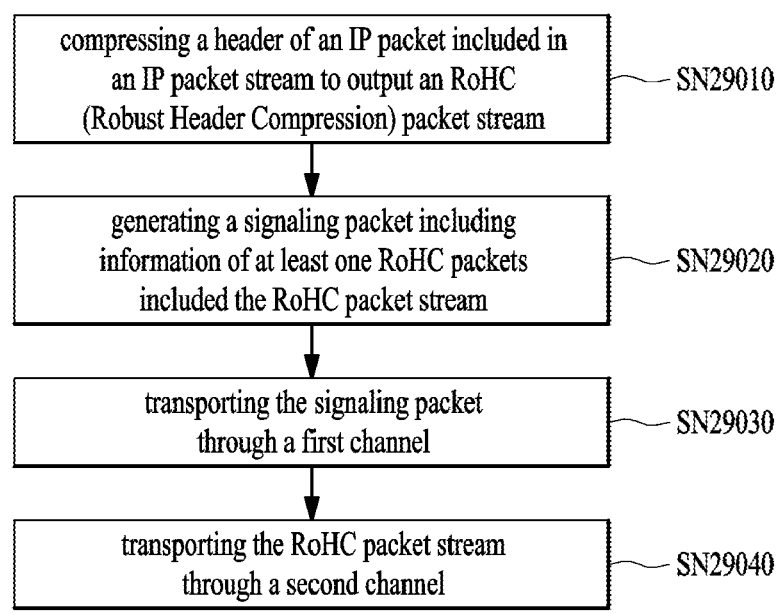
FIG. 29 is a flow chart illustrating a broadcast signal transmitting method according to an embodiment of the present invention.

FIG. 29 is a flow chart illustrating a broadcast signal transmitting method according to an embodiment of the present invention.

A broadcast signal transmitting method according to an embodiment of the present invention may be performed in the following order. First, the transmitting end may compress a header of an IP packet included in an IP packet stream to output an RoHC (Robust Header Compression) packet stream. (SN29010)

The processing of generating the RoHC packet stream and a configuration of each RoHC packet were previously described in detail with reference to FIGS. 1 to 21. Next, the transmitting end may generate a signaling packet including information of at least one RoHC packet included in the RoHC packet stream (SN29020), which was previously described in detail with reference to FIGS. 22 to 29. Next, the transmitting end may transport the signaling packet through a first channel. (SN29030) Next, the transmitting end may transport the RoHC packet stream through a second channel. (SN29040) The details of method for transmitting each packets was previously described in detail with reference to FIG. 4.

According to an embodiment of the present invention, the above described signaling packet may include a signaling packet header and a signaling packet payload. The signaling packet header may include signaling information included in the signaling packet payload.

The signaling packet header according to an embodiment of the present invention may include a fixed header and an extended header. The extended header may include a signaling class field and/or information type field. The signaling class field according to an embodiment of the present invention may indicate description related to channel scan and service acquisition, an emergency alert and a header compression. The information type field according to an embodiment of the present invention may locate after the signaling class field, and may indicate signaling information included in the signaling packet payload.

The signaling field included in the signaling packet header was previously described in detail reference with FIGS. 25 to 28.

Figure 30:
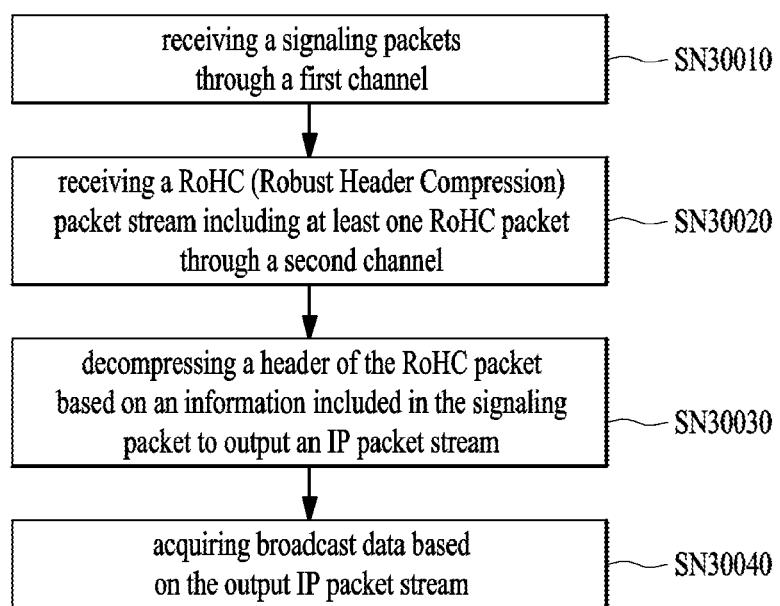
FIG. 30 is a flow chart illustrating a broadcast signal receiving method according to an embodiment of the present invention.

FIG. 30 is a flow chart illustrating a broadcast signal receiving method according to an embodiment of the present invention.

The broadcast signal receiving method according an embodiment of the present invention may correspond reverse processing of the broadcast signal transmitting method which was previously described in detail with reference to FIG. 29. In particular, the broadcast signal receiving method according an embodiment of the present invention may be performed in the following order. First, the receiving end may receive a signaling packets through a first channel. (SN30010) Next, the receiving end may receive a RoHC (Robust Header Compression) packet stream including at least one RoHC packet through a second channel, which was previously described in detail with reference to FIGS. 6 to 12. (SN30020) Next, the receiving end may decompress a header of the RoHC packet based on an information included in the signaling packet and may output an IP packet stream, which was previously described in detail with reference to FIGS. 10 to 12. (SN30030) Next, the receiving end may acquire broadcast data based on the output IP packet stream. (SN30040)

The broadcast signal receiving method according an embodiment of the present invention may process the signaling packet and RoHC packet stream which was previously describe in detail with reference FIG. 29. In particular, the signaling packet may include a signaling packet header and a signaling packet payload. The signaling packet header may include signaling information included in the signaling packet payload. The structure of the signaling packet and the signaling field included in the signaling packet was previously described in detail with reference FIG. 29.

Figure 31:
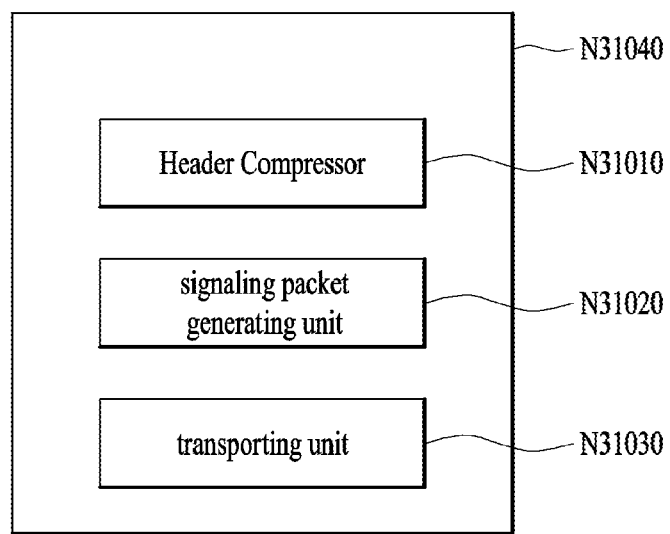
FIG. 31 is a diagram illustrating a broadcast signal transmitting apparatus according to an embodiment of the present invention.

FIG. 31 is a diagram illustrating a broadcast signal transmitting apparatus according to an embodiment of the present invention.

The broadcast signal transmitting apparatus (N31040) according to an embodiment of the present invention may include Header Compressor (N31010), signaling packet generating unit (N31020) and/or transporting unit (N31030). The broadcast signal transmitting apparatus (N31040) according to an embodiment of the present invention may perform the broadcast signal transmitting method which was previously described in detail with reference FIG. 29.

The header compressor (N31010) may compress a header of an IP packet included in an IP packet stream to output (or generate) a RoHC packet stream. The header compressor according to an embodiment of the present invention may referred to a RoHC compressor of header compression unit.

The signaling packet generating unit (N31020) may generate a signaling packet including information of at least one RoHC packets included the RoHC packet stream.

The transporting unit (N31030) may transport the signaling packet through a first channel and the RoHC packet stream through a second channel.

The units of the broadcast signal transmitting apparatus (N31040) were previously described in detail with reference to FIG. 5. Also, the units that may be included in the broadcast signal transmitting apparatus are not limited by drawings in present invention.

Figure 32:
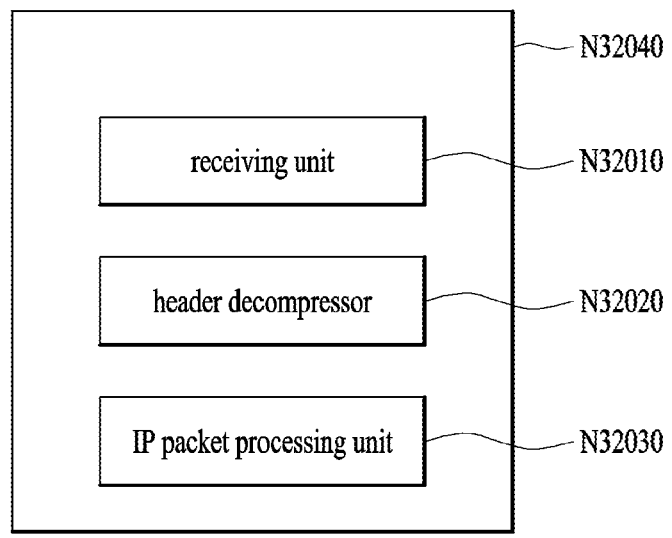
FIG. 32 is a diagram illustrating a broadcast signal receiving apparatus according to an embodiment of the present invention.

FIG. 32 is a diagram illustrating a broadcast signal receiving apparatus according to an embodiment of the present invention.

The broadcast signal receiving apparatus according to an embodiment of the present invention may perform reverse processing of the broadcast signal transmitting apparatus which was previously described in detail with reference to FIG. 31. Therefore, the broadcast signal receiving apparatus according to an embodiment of the present invention may perform the broadcast signal receiving method which was previously described in detail with reference to FIG. 30.

The broadcast signal receiving apparatus (N32040) according to an embodiment of the present invention may include a receiving unit (N32010), a header decompressor (N32020) and/or an IP packet processing unit (N32030).

The receiving unit (N32010) may receive a signaling packet through a first channel and to receive a RoHC (Robust Header Compression) packet stream including at least one RoHC packet through a second channel.

The header decompressor (N32020) may decompress a header of the RoHC packet based on an information included in the signaling packet to output an IP packet stream.

The IP packet processing unit (N32030) may acquire broadcast data based on the output IP packet stream. The units of the broadcast signal receiving apparatus according to an embodiment of the present invention (N32040) were previously described in detail with reference to FIG. 5.

Also, the units that may be included in the broadcast signal receiving apparatus are not limited by drawings in present invention.

The above-described steps can be omitted or replaced by steps executing similar or identical functions according to design.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

The present invention is available in a series of broadcast signal provision fields. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting a broadcast signal, the method comprising:
    compressing headers of Internet Protocol (IP) packets in an IP packet stream, the compressed IP packet stream including Initialization Refresh (IR) packets, a first IR-dynamic packet, and compressed IP packets;
    extracting context information from the compressed IP packet stream, wherein:
        when the context information is extracted only from the IR packets in the compressed IP packet stream, the IR packets are converted to a second IR-dynamic packet, and
        when the context information is extracted from both of the IR packets and the first IR-dynamic packet in the compressed IP packet stream, the IR packets and the first IR-dynamic packet are converted to compressed IP packets;
    generating signaling information including the context information;
    encapsulating the signaling information into a first link layer packet and the compressed IP packet stream into a second link layer packet,
    the signaling information including:
        an identifier identifying a data pipe corresponding to the signaling information and mode information for representing a mode for the extracting the context information; and
    transmitting a broadcast signal including the first link layer packet and the second link layer packet.

2. The method of claim 1,
    wherein the first link layer packet includes a header that indicates a current link layer packet carrying the signaling information, and an additional header that includes a signaling type field and a signaling type extension field,
    the signaling type field indicating a type of the signaling information,
    the signaling type extension field indicating an attribute of the signaling information.

3. The method of claim 1,
    wherein the mode information indicating a third mode when no context extraction is applied.

4. An apparatus for transmitting a broadcast signal, the apparatus comprising:
    a compression processor configured to compress headers of Internet Protocol (IP) packets in an IP packet stream, the compressed IP packet stream including Initialization Refresh (IR) packets, a first IR-dynamic packet, and compressed IP packets;
    a packet stream configuration processor configured to extract context information from the compressed IP packet stream, wherein:
        when the context information is extracted only from the IR packets in the compressed IP packet stream, the IR packets are converted to a second IR-dynamic packet, and
        when the context information is extracted from both of the IR packets and the first IR-dynamic packet in the compressed IP packet stream, the IR packets and the first IR-dynamic packet are converted to compressed IP packets;
    a signaling generation processor configured to generate signaling information including the context information;
    an encapsulating processor configured to encapsulate the signaling information into a first link layer packet and the compressed IP packet stream into a second link layer packet,
    the signaling information including:
        an identifier identifying a data pipe corresponding to the signaling information and mode information for representing a mode for the extracting the context information; and
    a transmitter configured to transmit a broadcast signal including the first link layer packet and the second link layer packet.

5. The apparatus of claim 4,
    wherein the first link layer packet includes a header that indicates a current link layer packet carrying the signaling information, and an additional header that includes a signaling type field and a signaling type extension field,
    the signaling type field indicating a type of the signaling information,
    the signaling type extension field indicating an attribute of the signaling information.

6. The apparatus of claim 4,
    wherein the mode information indicating a third mode when no context extraction is applied.

7. A method for receiving a broadcast signal, the method comprising:
    receiving a broadcast signal;
    generating a packet stream based on signaling information in a link layer packet in the broadcast signal, the signaling information including an identifier identifying a data pipe corresponding to the signaling information and mode information, wherein:

when the mode information indicates a first mode, a first Initialization Refresh (IR) packet for the packet stream is recovered by using a first IR-dynamic packet in the broadcast signal and context information for the first mode in the signaling information, and when the mode information indicates a second mode, a second IR packet and a second IR-dynamic packet are recovered by using compressed packets in the broadcast signal and context information for the second mode in the signaling information; and decompressing the packet stream.

8. The method of claim 7,
wherein the header in each signaling link layer packet indicates a current link layer packet carrying the signaling information, and the additional header in each signaling link layer packet includes a signaling type field and a signaling type extension field, the signaling type field indicating a type of the signaling information, the signaling type extension field indicating an attribute of the signaling information.

9. The method of claim 7, wherein mode information indicating a third mode represents no context extraction is applied.

10. An apparatus for receiving a broadcast signal, the apparatus comprising:
a tuner configured to receive a broadcast signal;
a recovery processor configured to generate a packet stream based on signaling information in a link layer packet in the broadcast signal, the signaling information including an identifier identifying a data pipe corresponding to the signaling information and mode information, wherein:

when the mode information indicates a first mode, a first Initialization Refresh (IR) packet for the packet stream is recovered by using a first IR-dynamic packet in the broadcast signal and context information for the first mode in the signaling information, and when the mode information indicates a second mode, a second IR packet and a second IR-dynamic packet are recovered by using compressed packets in the broadcast signal and context information for the second mode in the signaling information; and a decompressor configured to decompress the packet stream.

11. The apparatus of claim 10,
wherein the header in each signaling link layer packet indicates a current link layer packet carrying the signaling information, and the additional header in each signaling link layer packet includes a signaling type field and a signaling type extension field, the signaling type field indicating a type of the signaling information, the signaling type extension field indicating an attribute of the signaling information.

12. The apparatus of claim 10, wherein mode information indicating a third mode represents no context extraction is applied.

* * * * *